United States Patent
Richardson et al.

(10) Patent No.: US 7,050,546 B1
(45) Date of Patent: May 23, 2006

(54) SYSTEM AND METHOD FOR PROVIDING POTS SERVICES IN DSL ENVIRONMENT IN EVENT OF FAILURES

(75) Inventors: John William Richardson, Hamilton, NJ (US); Kumar Ramaswamy, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 303 days.

(21) Appl. No.: 10/089,773

(22) PCT Filed: Jun. 26, 2000

(86) PCT No.: PCT/US00/17476
§ 371 (c)(1),
(2), (4) Date: Apr. 2, 2002

(87) PCT Pub. No.: WO01/26313
PCT Pub. Date: Apr. 12, 2001

Related U.S. Application Data

(60) Provisional application No. 60/157,706, filed on Oct. 5, 1999, provisional application No. 60/210,257, filed on Jun. 8, 2000.

(51) Int. Cl.
*H04M 3/22* (2006.01)
*H04M 11/00* (2006.01)

(52) U.S. Cl. ............ 379/9.05; 379/27.01; 379/93.09

(58) Field of Classification Search ......... 379/1.01, 379/1.03, 1.04, 9.05, 9.06, 9, 22.04, 26.01, 379/27.01, 27.06, 32.01, 93.01, 93.09, 93.05, 379/93.14, 399.01, 399.02; 370/352, 493, 370/522, 473, 395.1, 395.6, 395.61, 463, 370/466, 216, 419, 420; 375/220
See application file for complete search history.

(56) References Cited

U.S. PATENT DOCUMENTS

| | | | | |
|---|---|---|---|---|
| 6,141,339 | A  * | 10/2000 | Kaplan et al. | 370/395.61 |
| 6,229,803 | B1 * | 5/2001  | Bog et al. | 370/352 |
| 6,320,867 | B1 * | 11/2001 | Bellenger et al. | 370/420 |
| 6,359,881 | B1 * | 3/2002  | Gerszberg et al. | 370/354 |
| 6,400,803 | B1 * | 6/2002  | Tate et al. | 379/27.06 |
| 6,731,627 | B1 * | 5/2004  | Gupta et al. | 370/352 |

FOREIGN PATENT DOCUMENTS

| | | |
|---|---|---|
| EP | 0844802 | 5/1998 |
| WO | 97/38511 | 10/1997 |
| WO | 97/46073 | 12/1997 |
| WO | 99/14929 | 3/1999 |

* cited by examiner

*Primary Examiner*—Barry Taylor
(74) *Attorney, Agent, or Firm*—Joseph J. Laks; Robert B. Levy; Joseph J. Kolodka

(57) ABSTRACT

A system and method are presented for providing a telephone service. An analog signal is received from a telephone and the analog signal is converted into a digital signal in a first format. A modem is provided for receiving the digital signal in the first format. A digitizer is also provided for receiving the analog signal from the telephone. The system, in a first mode of operation, couples the digital signal in the first format to the modem, and in a second mode of operation, couples the analog signal from the telephone to the digitizer. The second mode of operation may be, for example, a power failure mode of operation.

10 Claims, 22 Drawing Sheets

SYSTEM AND METHOD FOR PROVIDING POTS SERVICES IN DSL ENVIRONMENT IN EVENT OF FAILURES

This application claims the benefit under 35 U.S.C. § 365 of International Application PCT/US00/17476 filed Jun. 26, 2000, which was published in accordance with PCT Article 21(2) on Apr. 12, 2001 in English; and which claims benefit of U.S. provisional application Ser. No. 60/157,706 filed Oct. 5, 1999 and U.S. provisional application Ser. No. 60/210,257 filed Jun. 8, 2000.

INTRODUCTION

The present invention generally relates to a communication system and method, and more particularly to a system and method of providing voice service, for example, POTS, in the event of system failures. This invention is applicable to, for example, a DSL communication system.

BACKGROUND OF THE INVENTION

With the increasing popularity of the Internet, more and more business and residential customers are demanding high-speed broadband access. Broadband access may be provided via different types of physical medium, such as cable, satellite or traditional copper, telephone wires.

Since telephone wires typically represent high percentage of penetration in existing homes and businesses, various innovations have been proposed to increase the bandwidth of the existing telephone local plant. One such innovation is, for example, a modem which may operate with a speed of up to 56 kbps. Another innovation is Digital Subscriber Line (DSL) service. DSL service uses existing copper local loop for providing services to an end user. Another attraction of DSL is that it is capable of providing both high-speed data service and telephony voice service using the same telephone wire pair.

A generic network topology for DSL is illustrated in FIG. 1. DSL service is delivered over regular telephone wires 2-1 or 2-2 using DSL Access Multipexers (DSLAMs) 3 in a central office. For customers who receive only data service over DSL, the service is terminated at the customer premises with a DSL modem or router, shown as CPE equipment 4. In a traditional system offering DSL data only services, the POTS service coexists with the DSL service since POTS signaling is in baseband and DSL exists in a higher frequency band on the same wire coming to/from the customer premises. At both the customer premises site and the central office, POTS splitters 15 and 17 function to split the POTS signal from the data signal. The POTS signal is routed to the traditional voice network 14 at the central office and DSL data is routed to DSLAM 3, as shown in FIG. 1.

The next generation of devices have attempted to enhance the value of the DSL link by adding value added services such as digital voice links on this network. In such a model, digitized (and possibly compressed for bandwidth efficiency) voice is carried along with data over the DSL link. For combined voice and data service, DSL service is terminated by a device that provides integrated voice and data access, shown as CPE 5 in FIG. 1. Such devices typically offer an Ethernet port 6 for data and multiple analog POTS ports, for example, 7-1 and 7-2 for voice.

A DSLAM 3 serves as a packet multiplexer, typically delivering traffic from multiple customers over a high-speed uplink 8 to a metropolitan or regional packet network 9. The data network typically consists of an ATM switch. The packet protocol uses by the DSLAMs are packet protocols such as ATM or frame relay to support voice and data. Since the main data service used by DSL customers is accessing the Internet 11, the packet network is connected to the Internet, typically through a device known as a Subscriber Management System 12. Connection to an intra or enterprise data networks may also be used, to support home-based workers, for example.

A voice gateway 13 is used to deliver voice services to DSL customers. The voice gateway 13 connects the packet network to the public switched telephone network (PSTN) 14. Digital voice streams are converted into packet format for transport over the packet network between the voice gateway and the integrated access device on the customer premises. The voice gateway connects to the PSTN via a telephone switch, for example, a Class 4 or 5 switch.

Since the voice gateway 13 represents a digital access network from the point of view of the telephone switch, the connection between the gateway and the telephone switch typically makes use of a standard interface for digital loop carrier system such as GR-303, TR-008 or V5. This class of signaling is known as in-band signaling. There is a second class of signaling employed to communicate with a more intelligent digital loop carrier or edge device. This signaling stack is known as SS7 and represents an out-of-band signaling paradigm. The connection of the edge device to the telephone through the SS7 protocol stack is a link that is logically separate from the synchronous timeslots used in the class of in-band signaling protocols. What has been described so far is the known generic architecture for implementing a DSL service.

In addition to the traditional data and POTS services, various equipment manufacturers are introducing equipment for integrated digital voice and data services over DSL. As an example, Coppercom Communications Inc., of California provides equipment to DSL service providers for offering DSL services. In particular, the company has proposed a CopperComplete™ DSL architecture, shown for example, in FIG. 2.

The system architecture provided by CopperComplete™ DSL uses a voice gateway 21 behind the ATM switch 22. The voice gateway 21 is an additional piece of equipment that converts the packetized voice traffic to voice signals acceptable to the PSTN (Public Switched Telephone Network) via a Class 5 switch 23. The voice gateway 21 converts the incoming ATM Adaptation Layer 2 (ML2) cells to time division multiplexed voice signals and sends it to the Class 5 switch 23 using multiple T1 trunks 24. This interface is, for example, GR-303 interface, the same as used by digital loop carriers (DLC), as described before in connection with FIG. 1.

It is believed the voice path used in the Coppercom architectures is a permanent virtual circuit (PVC) that is configured during the provisioning of the CPE device, not in real time. This PVC carries all voice traffic as well as signaling traffic. The packet architecture used is ATM Adaptation Layer 2 (AAL2) for ATM encapsulation.

AAL2 has the ability to allow multiple connections multiplexed on one virtual circuit (VC). The multiplexing of multiple streams of data is done at the ATM Adaptation Layer. ATM adaptation only takes place at the endpoints of an ATM network. Cells in an ATM network are routed or switched based upon their virtual path/virtual channel (VP/VC) identifier. In the case of a permanent virtual circuit (PVC), as in the case of the Coppercom architecture, the cells are switched to the same permanent destination previously established at the time of the CPE provisioning.

The Coppercom architecture does not use the ATM network to setup and teardown the voice connections, but instead uses the voice gateway. It is, therefore, not possible to take advantage of the ATM network for switching of individual voice calls. This is because, as explained previously, in the Coppercom architecture, multiple voice calls are multiplexed along with signaling data onto a single ATM virtual circuit. The contents of the ATM cell stream are transparent to the ATM network. The ATM network only examines the header to ensure they are sent to the correct destination. The call assignment or switching in this architecture is independent of the ATM network. The call assignment cannot be determined until the signaling and voice data is de-multiplexed at the voice gateway.

SUMMARY OF INVENTION

Present inventors recognize that there are several drawbacks to prior DSL architectures. By using ATM AAL2 to carry voice, these architectures add significant cost and complexity to the end user equipment in terms of compression (when applicable), silence suppression, variable packet fill delay settings. In addition, there will be the need to multiplexing multiple streams of data onto one ATM virtual circuit at the CPE. Further, these architecture do not allow you to take direct advantage of the ATM network (e.g., the ATM switch) in terms of the dynamic capabilities of connection setup and teardown, resulting in inefficient use of system resources.

Therefore, present inventors have arrived at a better solution of using ATM AAL1 for carrying voice traffic, instead. AAL1 provides a simple method of carrying voice through an ATM network as well as the ability to dynamically setup and teardown connections at the ATM layer within the ATM network itself (see, e.g., ITU-TI.363.1: B-ISDN ATM Adaptation Layer Specification: Type 1 AAL).

Hence, one aspect of the present invention is a communication architecture whose voice path is based on a combination of a PVC and a switched virtual circuit (SVC). The PVC is setup from the CPE to the trunk port on the DSLAM. The SVC is the dynamic connection that can exist in the ATM switch for the purposes of setting up and tearing down voice connections. Each voice path is carried in an independent ATM virtual circuit, rather than multiplexing multiples of them together. The voice traffic is carried using AAL1. The signaling information is also carried independently of the voice and is also routed towards a service control processor rather than directly to the switch.

In this architecture, the value of the virtual path/virtual channel directly identifies the information contained within the cell and the user it is intended for. By using an independent ATM virtual circuit per voice channel, it is possible to setup and teardown the connection in the ATM switch (using a switched virtual circuit).

A service control processor externally controls the switch through inband signaling. This architecture exploits the power of the ATM switch by using its capabilities to dynamically setup and teardown connections. In this architecture, there is no decision making at the ATM Adaptation layer in the ATM network, the data is sent to the correct destination based upon the VP/VC. This connection is established at the ATM Layer.

In another aspect of the invention, the present inventors recognize that in a traditional DSL system, a POTS (Plain Old Telephone Service) splitter is typically used to terminate the DSL data connection at the DSLAM and the POTS service at the telco. switch. This is for example, shown in an embodiment shown in FIG. 1. By having the telephone connection terminating at the telco switch there exists a "lifeline" service because the POTS service is powered independently at the telephone company central office rather than from the consumers home or place of business. If a power outage were to happen, POTS service would still be available.

On the other hand, in a voice enabled DSL system, where the primary and secondary voice lines are carried in the DSL spectrum rather than in POTS, there exists a problem of not having the lifeline telephone service in the event of a power outage. In order to keep the lifeline service you could use the voice enabled DSL system to offer only additional secondary phone lines and rely on traditional POTS for primary telephone service. In this scenario, as previously described, POTS is terminated at the telephone company switch, and there does not exist a concentration function for primary voice lines in the voice enabled DSL network. The concentration function can only be achieved for the secondary voice lines. This is undesirable from the DSL service provider standpoint. A one-to-one mapping of telco. switch terminations per POTS line will need to be secured from the telephone company.

Therefore, a system and method are presented which solve the problem of offering POTS from the DSL network and also enable the DSL service provider to concentrate the primary and secondary telephone traffic locally. This means a DSL service provider does not need to have a one-to-one mapping per POTS line. This invention provides a piece of equipment to the DSL network. This can be integrated into the traditional DSLAM or can be an entirely different piece of equipment. The piece of equipment functions as a POTS terminator and digitizer. The function of this entity is to terminate the POTS line, for example, at the central office and digitize the voice, convert it to ATM, and then terminate it into the DSL network at the point of the ATM switch. The POTS terminator has similar functionality to the customer CPE device 33-1 in FIG. 3, in terms of signaling and digitization of the voice signal and converting the signal into an ATM format. All voice ports on the customer CPE device can be carried through the DSL network, and in the event of a power failure, a relay or a switch in the CPE device can connect one of the phones directly to the POTS line.

A system and method are thus presented for providing a telephone service. An analog signal is received from a telephone and the analog signal is converted into a digital signal in a first format. A modem is provided for receiving the digital signal in the first format. A digitizer is also provided for receiving the analog signal from the telephone. The system, in a first mode of operation, couples the digital signal in the first format to the modem, and in a second mode of operation, couples the analog signal from the telephone to the digitizer. The second mode of operation may be, for example, a failure mode of operation. It is also important to note that this aspect of the invention may be applied to other DSL architectures (e.g., shown in FIG. 1 or 2), as well as the improved architecture shown in FIG. 3 of the present invention.

DETAILED DESCRIPTION

Figure 3:
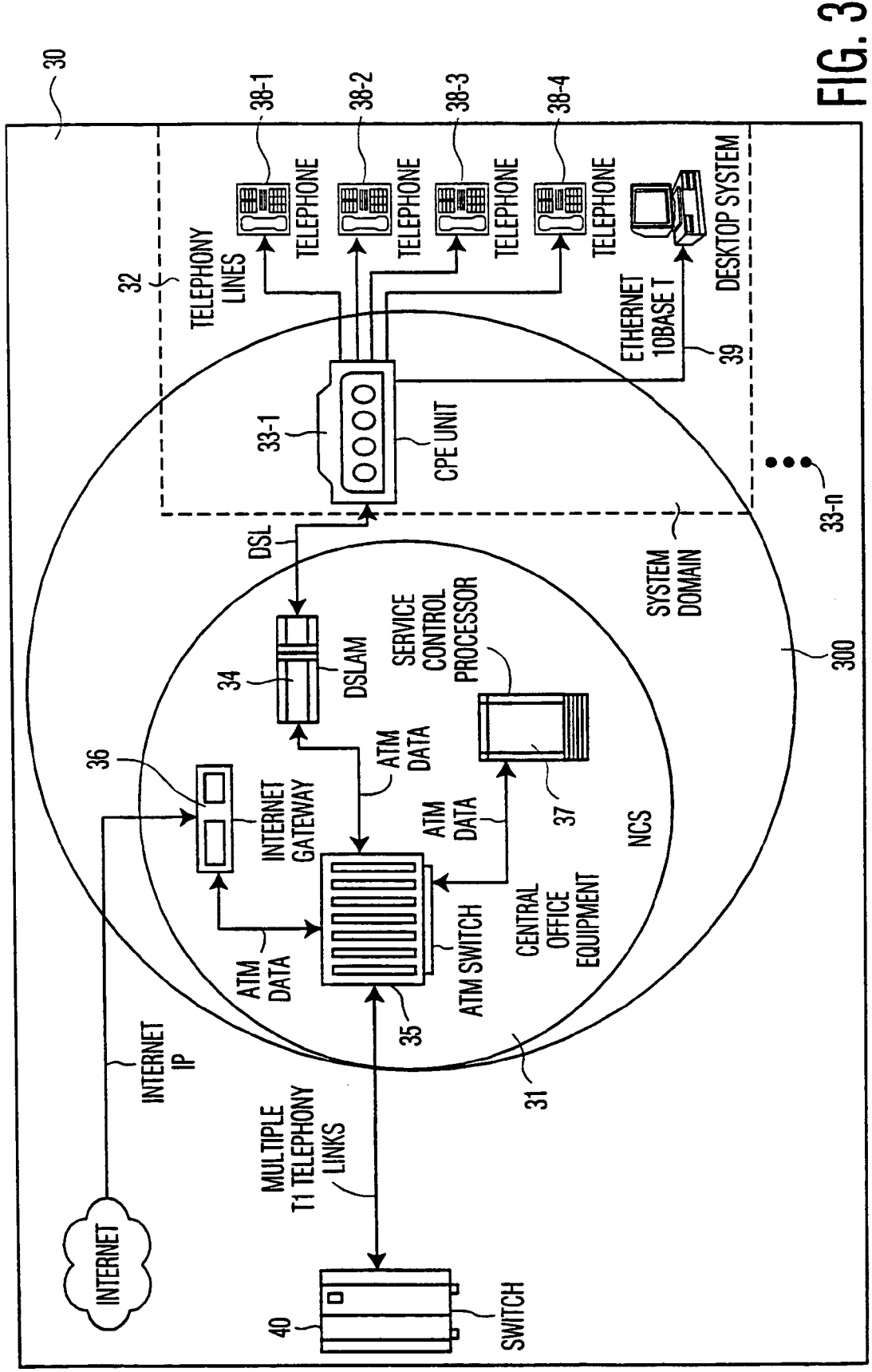
FIG. 3 is a system diagram of a DSL system according to the principles of the present invention.

An exemplary embodiment according to the principles of the present invention is shown in FIG. 3.

The System Block Diagram 30 is composed of several functional blocks. The System Domain 300 is composed of Central Office (CO) Equipment domain 31 (also refers to as Network Control System (NCS) hereinafter) and Customer Premise Equipment (CPE) domain 32. The component blocks within the System Domain and their respective interfaces are:

Customer Premise Equipment (CPE) Unit 33-*n*

Digital Subscriber Line Access Multiplexer (DSLAM) 34

ATM Switch 35

Internet Gateway 36

Service Control Processor (SCP) 37

CPE Unit 33-*n*

The CPE unit 33-*n* consists of an internal DSL Modem unit that interfaces with, for example, up to 4 separate analog telephones 38-1 to 38-4 (via POTS) and one 10Base-T Ethernet connection 39. From the customer's analog end, the CPE device, for example, 33-1, accepts the analog input from each of the telephones 38-1 to 38-4, converts the analog input to digital data, and packages the data into ATM packets (POTS over ATM), with each connection having a unique VPI/VCI. A VPI is a Virtual Path Identifier and a VCI is a Virtual Channel Identifier. The ATM network is connection oriented which can be characterized by a VPI/VCI pair. The VPI is used to identify a virtual path that exists over a physical medium. The VCI is used to identify the virtual channel within a virtual path. This leads to the concept of a PVC (permanent virtual circuit) or a SVC (switched virtual circuit). A PVC is a connection between two endpoints and is usually manually configured. It is a path from end-to-end established using VPI/VCI value pairs at each node along the way through the ATM network. A SVC is similar to a PVC, except it is setup or torn down on a demand basis using a signaling protocol.

The Ethernet data is also encapsulated into ATM cells with a unique VPI/VCI. The ATM cell stream is sent to an internal DSL Modem within the CPE unit to be modulated and delivered to the DSLAM 34.

From the DSLAM end, the DSL signal is received and demodulated by the CPE DSL Modem and delivered to VPI/VCI Detection processing. The ATM cell data with VPI/VCI matching that of the end user's telephone is then extracted and converted to analog POTS to be delivered to one of the telephones 38-1 to 38-4. The ATM cell data with VPI/VCI matching that of the end user's Ethernet connection is extracted and delivered to an internal Ethernet transceiver for delivery to the Ethernet port. The above process will be described in depth in connection with detailed description of the CPE and components below.

DSLAM 34

The DSLAM 34 demodulates the data from multiple DSL modems 33-1 to 33-*n* and concentrates the data onto, for example, an ATM backbone network for connection to the rest of the network. The DSLAM 34 provides back-haul services for packet, cell, and/or circuit based applications through concentration of the DSL lines onto ATM outputs to the ATM Switch 35.

ATM Switch 35

The CO ATM switch 35 is the backbone of the ATM network. The ATM switch performs various functions in the network, among them:

Cell Transport

Multiplexing and concentration

Traffic Control

ATM-layer management

Of particular interest in the System Domain 30, the ATM switch provides for the cell routing and buffering in connection to the DSLAM 34, Service Control Processor 37 and the Internet Gateway 36, and T1 circuit emulation support in connection with the Public Switch 40 that handles voice telephone calls.

One exemplary embodiment of an ATM switch may be a Newbridge MainStreetXpress 36170 Multiservices Switch (Newbridge 36170). This switch has DSLAM capability and individual DS0 control capability via T1 Circuit Emulation cards. It is possible that neither the DSLAM capability nor the DS0 control will be integrated into the switch, but rather in discrete components.

Another exemplary embodiment of an ATM switch may be a Lucent Access Concentrator with optional T1 cards added. The concentrator functions as the routing mechanism to aggregate and disperse data to various destinations within and outside the NCS, under the control of the SCP 37.

In one embodiment of the invention, optional T1 cards are installed in the ATM switch that allow ATM cells to be placed onto a DS0 timeslot as part of a T1 connection. There may be, for example, 6 T1 ports per card. In this case, the T1 card is connected to the Telco's switching network.

Another exemplary interface from the ATM switch 37 to the telco switch 40 may be via a GR-303 interface. The GR-303 interface defines an Interface Group (IG) which may contain from 1 to 28 DS1 connections. Channels 12 and 24 are used for control information on the first DS1 connection. If there is a second DS1 in the IG, it contains redundant control information on channels 12 and 24 also. These channels are only used on the first 2 DS1 connections. All other DS1 connections utilize all 24 channels for voice traffic.

For the 1 or 2 DS1 s that contain control information, channel 12 is used as the Timeslot Management Channel (TMC) and channel 24 is used as the Embedded Operations Channel (EOC).

Figure 12:
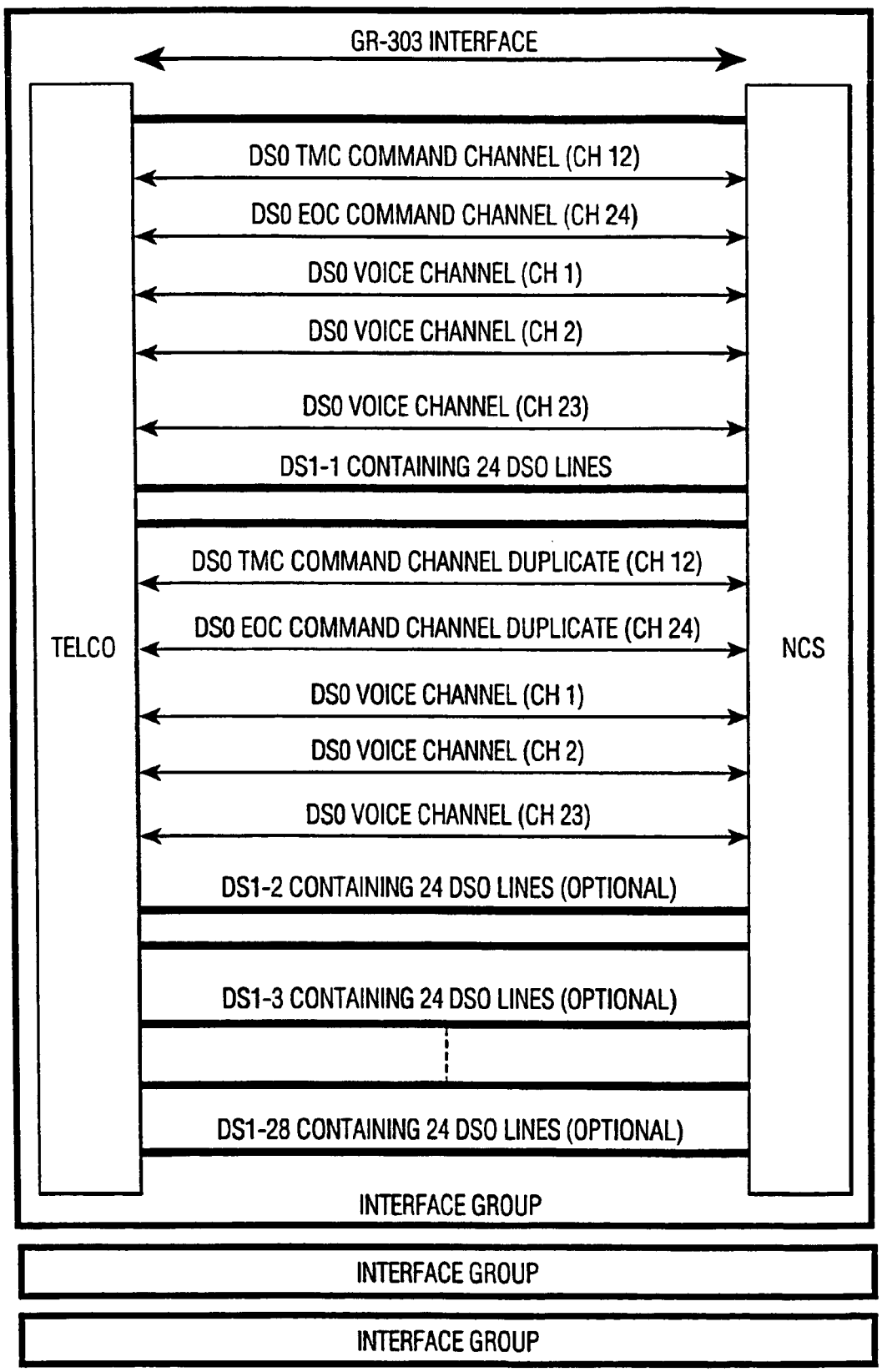
FIG. 12 shows a block diagram of and GR-303 interface.

A block diagram of this interface is shown in FIG. 12.

Internet Gateway 36

The Internet Gateway 36 provides for the ATM signaling support of internetworking of IP over ATM in connection to and from the ATM switch 35. An exemplary embodiment of an Internet Gateway may be a Cisco 7200 Series High Performance Router. This router has the capacity for four ATM ports and 32 10Base-T Ethernet ports. Other models may also be chosen based on capacity and performance.

Service Control Processor (SCP) 37

The SCP 37 provides for address translation, demand assignment and call management functions similar to an Internet Domain Name Service (DNS) server. The SCP 37 would be available for other functions as well, such as downloading code to the CPE and bandwidth and call management (e.g., busy) functions as well as other service provisioning and setup tasks.

One exemplary embodiment of a SCP is a Performance 500 series PC, on sale from Gateway, populated with one or two Fore Systems ForeRunnerHE 155 ATM Server Adapters. The ForeRunnerHE 155 supplies the SCP with full duplex OC-3 connectivity to the Newbridge 36170 which may serve as an ATM switch. One of the ATM adapters will serve as the dedicated command link to the Newbridge 36170. If the Newbridge 36170 supports a Proxy Server type of control and if such a control channel requires a separate port, then the second ATM adapter would be installed in the SCP. This ATM adapter would then serve as the data path for a PVC between the SCP and the Newbridge 36170.

Figure 13:
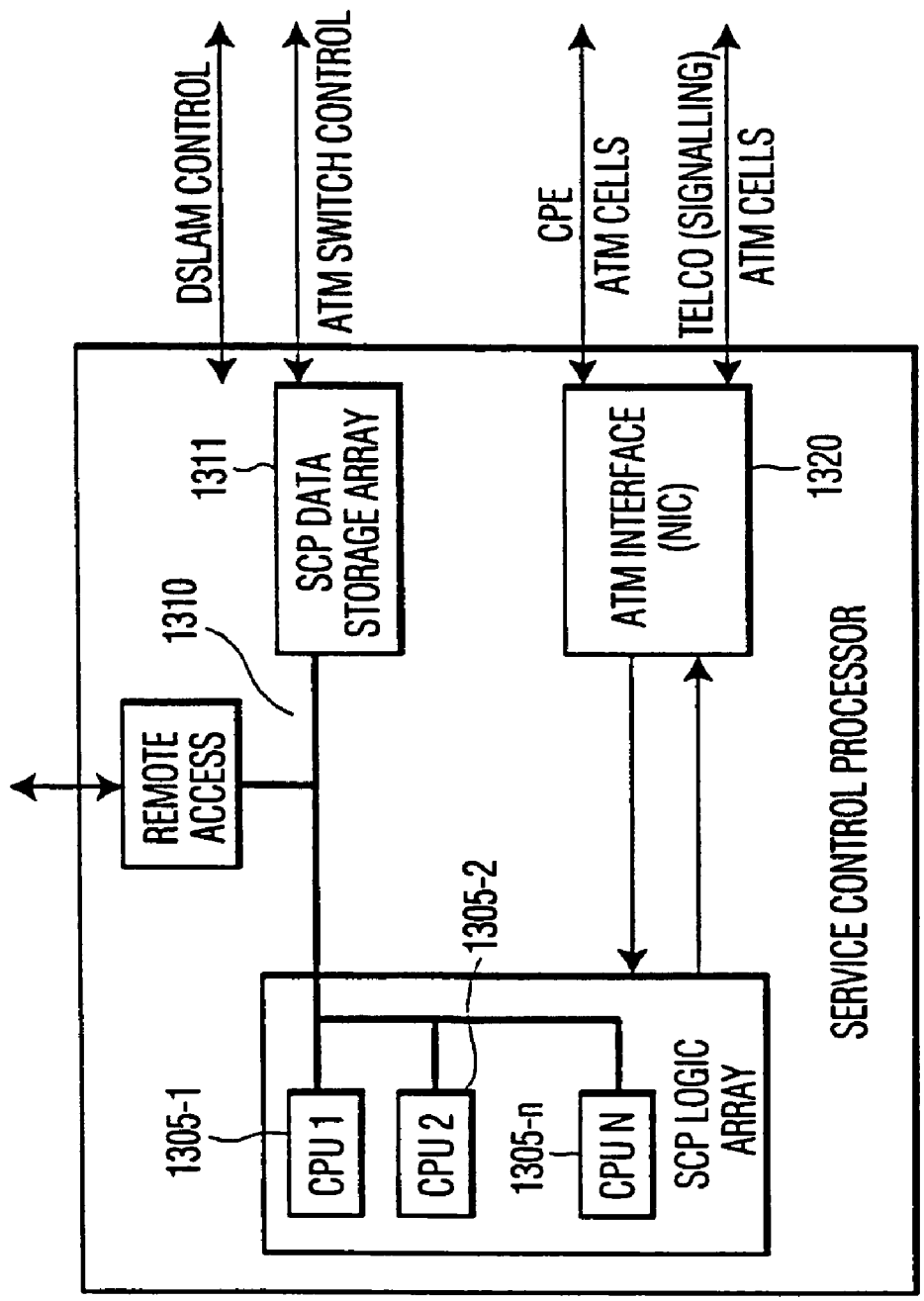
FIG. 13 shows an exemplary embodiment of a SCP in distributed environment.

FIG. 13 shows another exemplary embodiment of an SCP in distributed environment. The decision units (CPUs) 1305-1 to 1305-*n* will consist of one or more off-the-shelf industrial packaged (rackmount) computers running an operating system capable of performing the functional tasks. Note that different CPUs may be running different operating systems if various software requires a specific platform in order to operate. The desired platform should be scalable so that additional processing power can be added with a minimum amount of re-work or design changes.

As shown in the figure, all components are connected via an internal private LAN 1310 (e.g., Ethernet) for ease of communication and connectivity. The data storage array 1311 comprises of network attached storage units that are connected to the LAN 1310 (e.g., an ethernet) for ease of communication and connectivity. The data storage array 1311 comprises of network attached storage units that are connected to the LAN 1310. This will allow direct access to the data through the remote access device in the event access is required for status and/or troubleshooting.

The ATM interface block 1320 is the interface that transforms ATM cells into data that can be processed by the CPUs. In an alternative, an ATM NIC on one or more CPUs could be used for this purpose. Control signals to and from the DSLAM and ATM switch are also required for NCS operation. They may be in-band or out-of-band signals.

Figure 14:
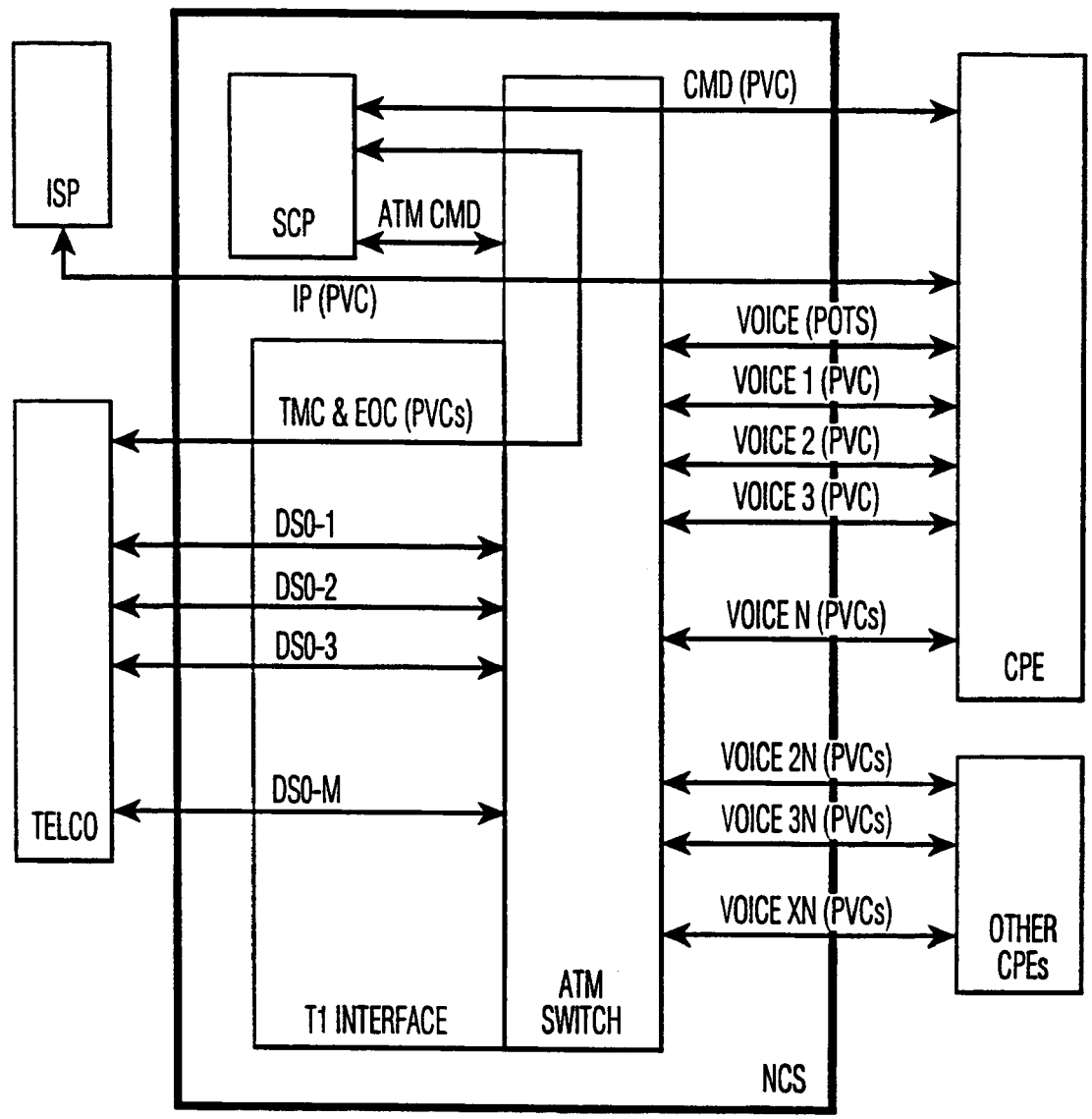
FIG. 14 is a block diagram that shows how voice channels are allocated between a CPE and the Telco, through a SCP.

FIG. 14 is a block diagram that shows how voice channels are allocated between a CPE and the Telco, thru a SCP, in accordance with the present invention. A SCP-CPE logical connection is used to control the data paths between the CPE unit, the ISP and Telco. All data paths between the CPEs and the NCS will have PVCs already established. This will allow 24-hour access to the ISP and a channel that will allow the exchange of control information between the SCP and the CPE.

The voice channels will also be PVCs (each with a variable rate) but only between the CPE and the ATM switch, as shown in FIG. 14. The SCP will have to establish a connection in real time between the Telco and the voice channel, through, for example, an ATM switch, as calls are requested. This is due to the limited amount number of DS0s between the NCS and the Telco. Each voice data path will require a DS0 in order to connect up to the Telco. For economic reasons, the number of DS0s will be less than the total number of possible voice channels. Because of this, the SCP will have to dynamically allocate DS0s as required to the CPE voice channels. The SCP will be responsible for handling and establishing all voice connections for both incoming and outgoing calls to the NCS and its CPEs.

As shown in the FIG. 14, the total number of voice channels from CPEs (XN) is much greater than the number of available DS0 slots (M) leaving the NCS. Therefore, the SCP must allocate the DS0 channels dynamically as calls are connected to the CPEs. The SCP has a command channel to the ATM switch that it uses to issue commands to the ATM switch so that it can route the CPE voice channels to the T1 interface and ultimately to the Telco.

When a voice call data path to the Telco is established, the ATM switch is commanded to route the appropriate VPI/VCI to one of the DS0 slots on one of the T1 cards. The tracking of which DS0s and T1 ports are available is maintained by the SCP. All ATM cell conversions are handled by the T1 cards.

The SCP controls all aspects of the ATM switch including initial set-up.

The control of the ATM switch can be achieved in one or more of the following ways:

1. through the RS232 port using terminal emulation. This is out-of-band signaling.
2. through the Ethernet port using Telnet. This is out-of-band signaling.
3. allocating a PVC between the SCP and the ATM switch. The SCP runs an SNMP client and controls the switch by using in-band signaling; and/or
4. through the use of the API on the ATM switch (the PacketStar Signaling Gateway). This is in-band signaling.

Use of in-band signaling will probably provide the fastest response from the ATM switch but with increased complexity of the interface. In addition, in-band signaling can use already established ATM data paths. This will be especially useful in the event that the SCP and the ATM switch are not co-located.

Note that out-of-band signaling can utilize the ATM data paths already in existence and provide pseudo in-band signaling. For example, through the use of Local Area Network Emulation (LANE) provided by ATM.

The SCP may communicate with the IP Internet gateway 36 through the RS232 port or by using an SNMP client via TCP/IP.

The T1 interface to the Telco switch 40 transforms the ATM cells into data that is put onto a DS0 channel and transmitted through a T1 line to the Telco switch. The reverse happens when data is received at the NCS.

The T1 interface consists of line cards that are installed as options on the ATM switch. The SCP will route data to an individual DS0 slot on a T1 card by issuing a command to the ATM switch.

Detailed CPE Unit Implementation

Figure 4:
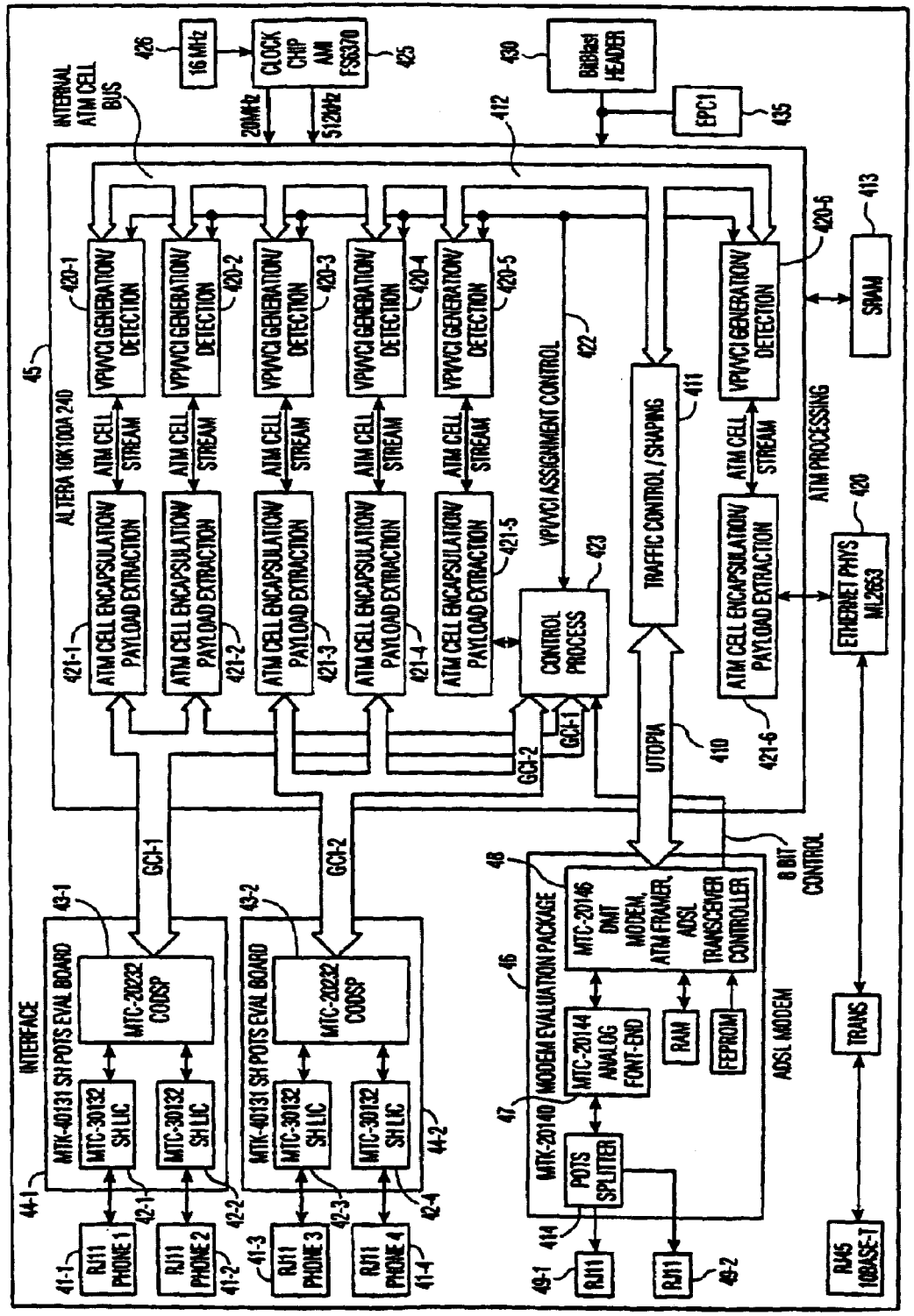
FIG. 4 shows an exemplary detailed embodiment of a CPE unit in circuit block diagram form.
Figure 5:
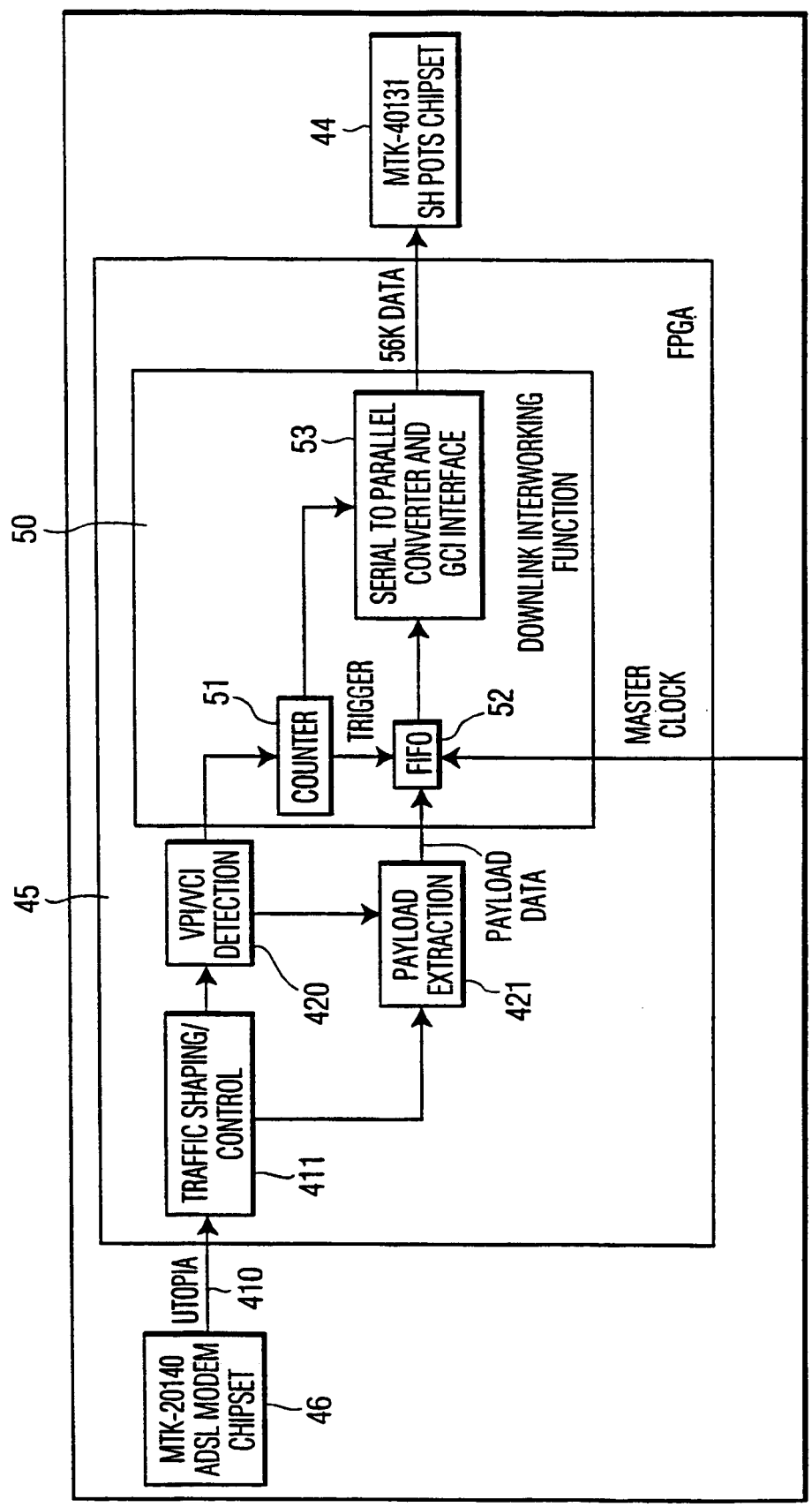
FIG. 5 shows a block diagram for performing a downlink operation within FPGA 45.

An exemplary detailed embodiment of a CPE unit 33-$n$ is shown in circuit block diagram form in FIG. 4. The embodiment of the CPE unit architecture may comprise of, for example, an Altera 10K100A 240 pin FPGA 45, two Alcatel MTK-40131 SH POTS Evaluation Boards 44-1 and 44-2, an Alcatel MTK-20140 DSL Modem Evaluation Package 46, and several peripheral devices such as memory SRAM 413 and Ethernet physical layer processor 420. Each of these major CPE unit components is described in detail in the paragraphs that follow. These components may be used to test and evaluate, as well as implement the principles of the present invention.

One skilled in the art will readily recognize that the components selected and described herein for implementing a CPE unit, for example, CPE 33-1, in accordance with the present invention are exemplary only. They are chosen mainly for the purpose of being able to implement the principles of the present invention expediently, using readily available off-the-shelf products. Other circuits or integrated circuits performing the same functions of these components as described herein may also be used, as will be apparent to one skilled in the art.

Telephone Interface—Alcatel MTK-40131 SH POTS Evaluation Boards 44-1 and 44-2

Figure 1:
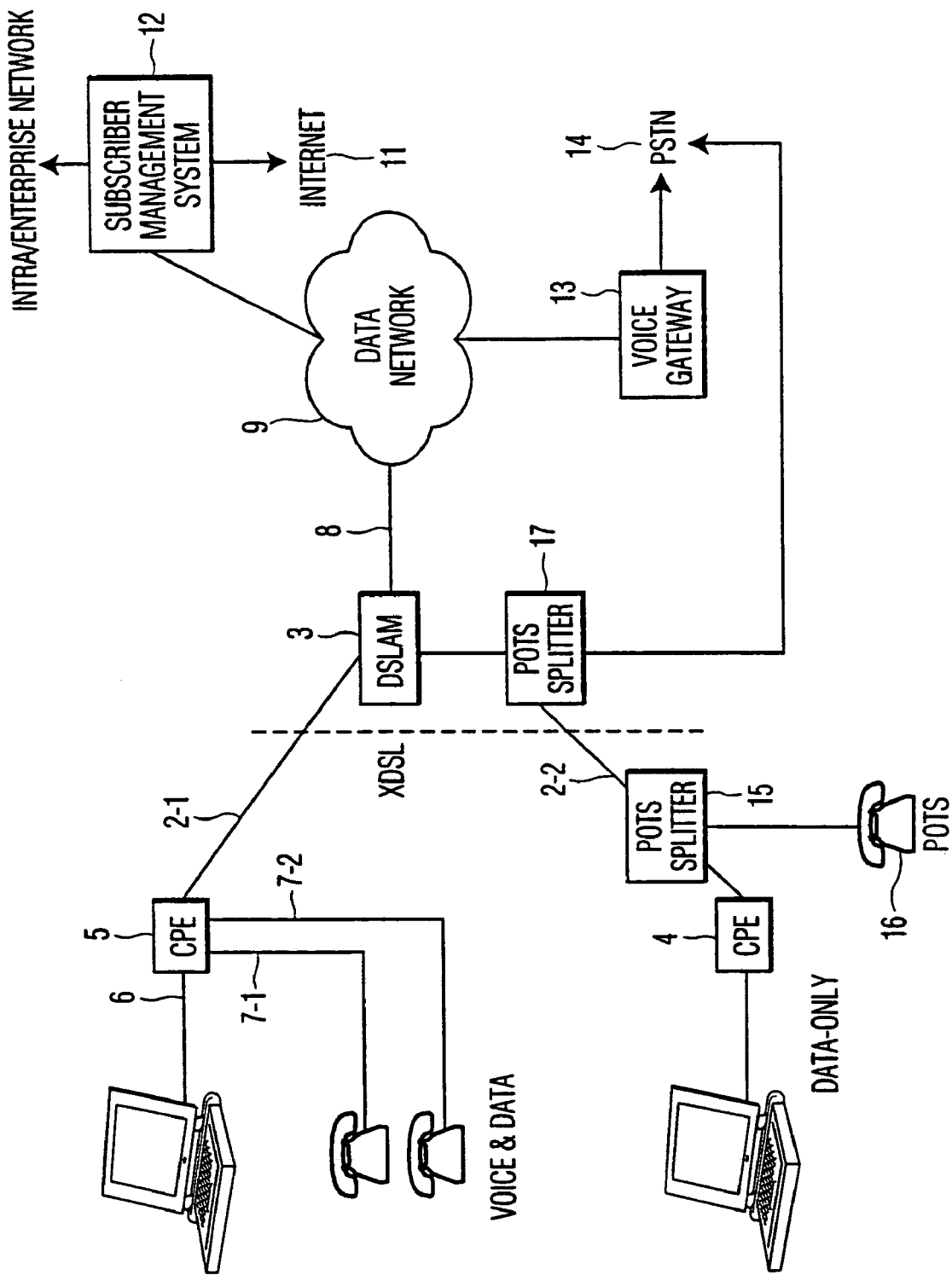
FIG. 1 shows a block diagram of a known DSL architecture for providing services.

The Alcatel MTK-40131 Evaluation Boards 44-1 and 44-2 are used as interface boards to POT telephones 38-1 to 38-4 (shown in FIG. 1) via RJ11 connections 41-1 to 41-4. These boards comprising functions such as, for example, Analog to Digital Conversion (A/D), Digital to Analog Conversion (D/A), and line interface control, necessary to connect analog telephone sets or other analog terminals into digital communications systems.

As shown in FIG. 4, each of the MTK-40131 Evaluation Boards contains three devices: two Short-Haul Line Interface Circuits (SH LIC) 42-$n$ that provide the signal and power interface to the analog lines (one per line) and a DSP based CODEC (CODSP) 43-$n$ that provides all signal processing functions for up to two independent two-wire phone lines.

The digital interface to the Alcatel MTK-40131 Evaluation Boards is the General Circuit Interface (GCI). Ring signaling, on-hook signaling, off-hook signaling, and alarm detection are all provided to the Altera FPGA 44 by the Alcatel MTK-40131 Evaluation Boards, via the GCI interface 1 or 2.

The two Alcatel MTK-40131 Evaluation Boards 44-1 and 44-2 provide analog POTS to digital interfacing for up to four analog telephones 38-1 to 38-4. Of course, more of less of these Evaluation Boards may be used and the rest of the circuit scaled up or down accordingly, to provide capacity to accommodate more or less than 4 analog telephones.

For downlink data (i.e., towards an end-user telephone), the CODSP 43-1 or 43-2 routes incoming GCI data to one of the MTC-30132 SH LIC units for D/A conversion and delivery to one of the analog phone ports 41-1 to 414. For uplink data (i.e., towards the network), the MTC-30132 SH LIC units 42-1 to 42-4 convert incoming phone port analog data to digital and deliver the digital data to the CODSP 43-1 and 43-2. The CODSPs then deliver the digital data to the FPGA 45 via the GCI interfaces, as pointed out previously.

ADSL Modem—Alcatel MTK-20140 Rate Adaptive ADSL Modem Evaluation Package 46

The Alcatel MTK-20140 chipset 46, as shown in FIG. 4, consists of an Analog Front-End (MTC-20144) 47 and a digital chip (MTC-20146) 48. MTC-20146 integrates three components and or functions:

DMT (Discrete Multi-Tone) modem

Dedicated ADSL Transceiver Controller with associated firmware

ATM Framer

The MTK-20140 46 therefore provides all the active functions required to implement a complete ATM-based, rate adaptive DMT ADSL modem.

The data interface between the MTK-20140 46 and the Altera FPGA 45 is implemented as an ATM Utopia interface 410. The MTK-20140 also provides a POTS splitter 414 with connectivity to two RJ11 ports 49-1 and 49-2. RJ11 49-1 may be used for connection to the telephone wire pair from the central office, for example, while the other jack, 49-2, may be used for connection to an analog POTS telephone.

ATM Processing—Altera 10K100A 240 Pin Field Programmable Gate Array (FPGA) 45

The Altera FPGA 45 (which will now be referred to simply as FPGA) has been programmed to provide general ATM processing for the DSL service. In particular, functions of the FPGA 45 comprise ATM cell stream processing, control signal processing, GCI interfacing to the MTK-40131 SH POTS units 44-1 and 44-2, UTOPIA interface and control to the MTK-20140 ADSL modem 46, and traffic control and shaping for the CPE unit in general.

DS0/ATM Interworking Functions (IWF's)

On the FPGA uplink path (CPE to Network), 56 kbps data will be packaged into ATM cells as part of the ATM Cell Encapsulation function provided by FPGA 45. The 56 kbps data is the data to be carried on a DS0 channel.

The issue of how much bandwidth is required to transfer a single DS0 seems harmless and straightforward until one reads the ATM Forum's af-vtoa-0078 (Circuit Emulation Service Interoperability Specification) and af-vtoa-0085 (Specifications of (DBCES) Dynamic Bandwidth Utilization—In 64 kbps Time Slot Trunking Over ATM—Using CES) specifications.

According to af-vtoa-0078, a single DS0 could require the entire T1 bandwidth if it is the only active channel in the T1. This may be fine for a switching fabric, but it is not fine for the ADSL uplink path. The af-vtoa-0085 specification allows for not sending idle channels, but bandwidth is still consumed by ATM pointer overhead. Both specifications allow (actually necessitate) the usage of IWF's to aid in efficient bandwidth management.

In the DSL system in accordance with the present invention, the DS0 data must be packed into ATM cells as efficiently as possible (in terms of bandwidth usage). There are IWF's on both the FPGA uplink and downlink paths as well as in the network. On the CPE uplink path, the IWF packs the 56 kbps data (in octets) into an ATM cell payload, and waits until the payload is full before transmitting the cell. This introduces a small delay (about 6 msec) in the transmitted data.

On the CPE downlink path, the IWF extracts the payload data and delivers it to the MTK-40131 SH POTS unit at a rate of 56 kbps. The network IWF's are analogous to the CPE IWF's. The network IWF's may be contained in an addressable box between the ATM switch and a T1 CES card. Alternatively, there may exist a T1 CES card that performs the network IWF as needed for the DS0 data.

FPGA Downlink Path

The ADSL modem 46 sends data to the FPGA 45 via the UTOPIA interface 410. The UTOPIA data enters the Traffic Control and Shaping function 411 in FPGA, which routes the data to the internal ATM Cell Bus 412. Each of the nodes on the internal ATM Cell Bus 412 performs VPI/VCI detection and filtering on the incoming ATM cells, as shown for examples, as blocks 420-1 to 420-6.

If a VPI/VCI detection function detects a VPI/VCI match, the processing node passes the ATM cell data to the ATM cell payload extraction function, shown as blocks 421-1 to 421-6.

For the telephone ports, the ATM cell payload extraction function sends the extracted payload data to the MTK-40131 SH POTS unit via the GCI bus protocol. For the Control Process path 422, the ATM cell payload extraction function sends the extracted payload data to the Control Process function 423.

Figure 21:
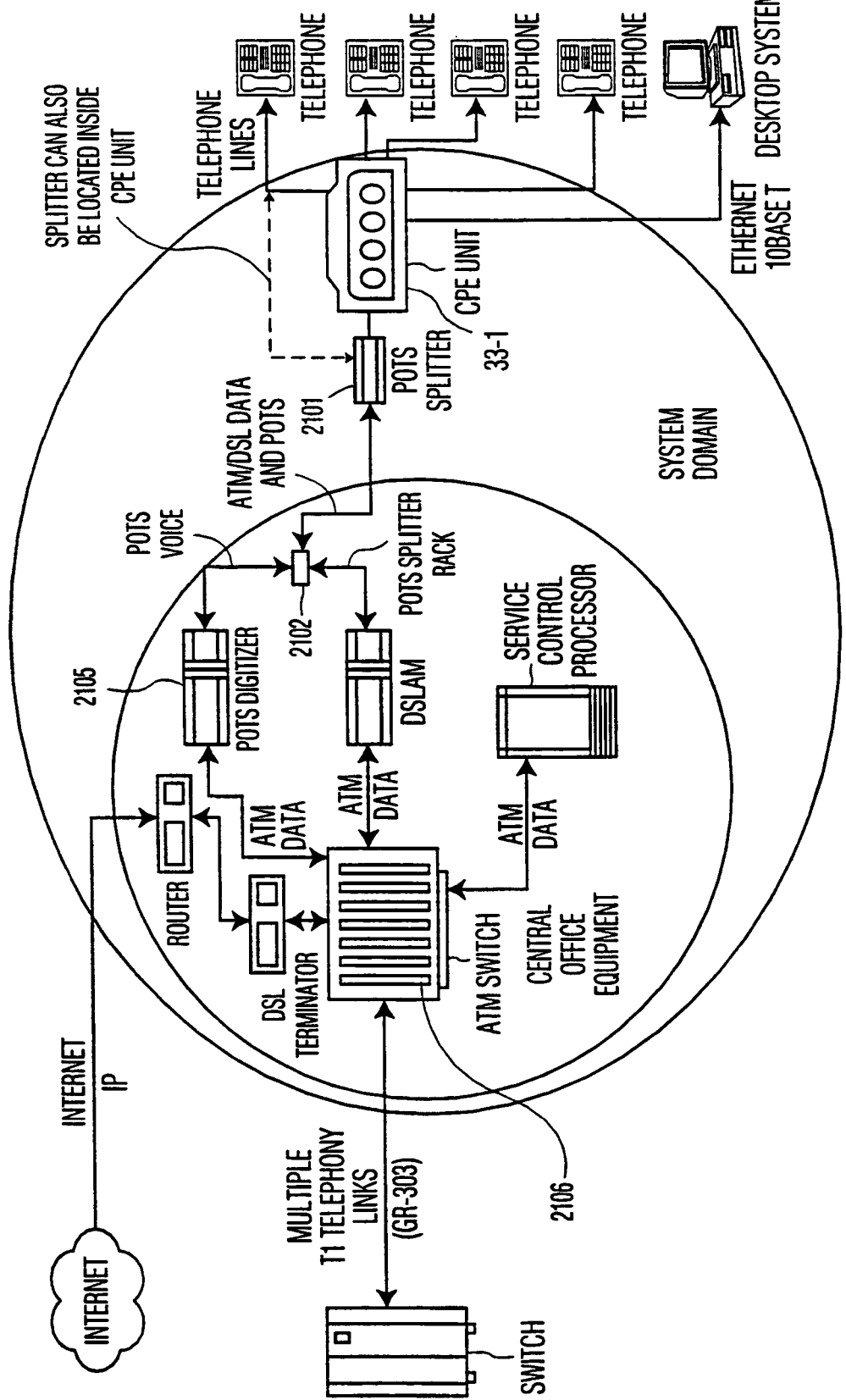
FIG. 21 is an embodiment of a way to offer POTS service in accordance with the principles of the present invention.

FIG. 21 shows an enhanced system and method of offering POTS through a DSL network to overcome the disadvantages of the architecture described above. As shown in FIG. 21, a POTS digitizer 2105 is added to the network. The POTS digitizer 2105 is coupled between a POTS splitter 2102 and an ATM switch 2106. The function of POTS digitizer 2105 is to terminate the analog POTS line, digitize the voice, convert it to ATM, and then terminate it into the DSL network at the point of the ATM switch 2106. This POTS digitizer 2105 has similar functionality as the customer CPE device as shown in FIGS. 3 and 4 and described before in terms digitizing analog voice, converting the digitized voice to an ATM stream and signaling and communicating with a Service Control Processor.

As described before, an uplink ATM Cell Encapsulation Interworking Function is also needed. This is shown in FIG. 6 of the present invention.

Figure 6:
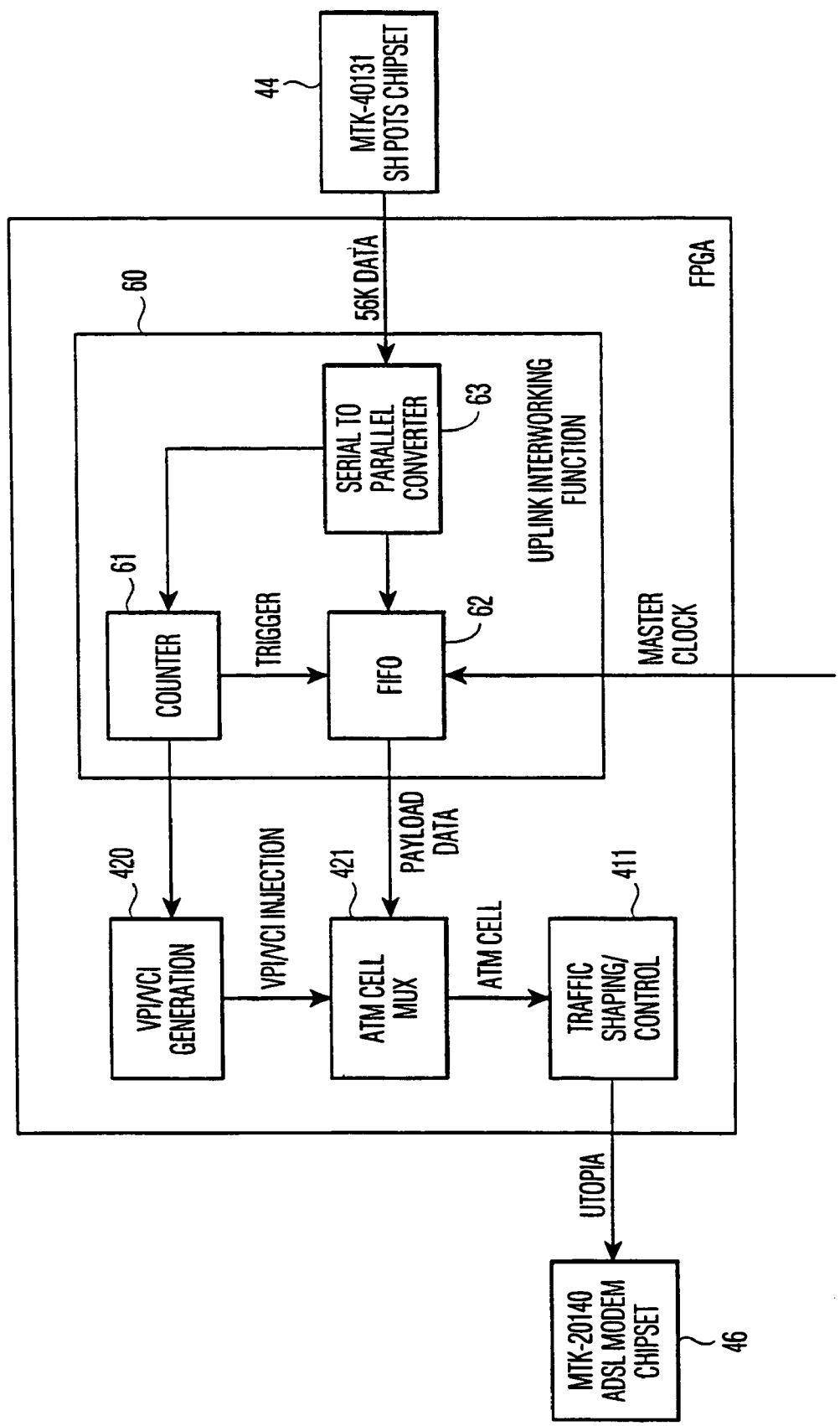
FIG. 6 shows an uplink ATM Cell Encapsulation Interworking Function.

As shown in FIG. 6, the telephone port data (via the GCI interface) and the Ethernet data 10Base-T Physical Interface Chip enter their respective ATM Cell Encapsulation functions at 60. The resulting ATM cells are sent to the VPI/VCI Generation function 420, which inserts VPI/VCI data into the cell and delivers the ATM cell to the Traffic Control/Shaping function 411. This data is then sent to the MTK-20140 ADSL modem unit 46 for transmission. The uplink ATM Cell Encapsulation function 60 for all of the ports contains an IWF that packs the DS0 data into full ATM cell payloads and delivers the data to the ADSL modem.

The CPE FPGA 45 formats an AAL1 ATM cell for the telephone ports in the manner described by tables 1 through 8 using counter 61, F1F0 62, and converter 63. The Structured Data Transfer (SDT) pointer in this system always has a value of 0×00. The sequence count field that is contained in the tables refers to the sequence count field in the SN field defined in Section 2.4.2.1 of ITU-T I.363.1. The sequence count field counter 61 is a 3 bit field that starts with a value of 0 and increments in each successive ATM cell to a maximum of 7 and then wraps to a value of 0 (modulo 8).

When the SN counter is 0, the SDT pointer is present in the ATM cell. This ATM cell stuffing format is known as 1×56 with CAS. The ABCD bits (CAS bits) are placed in the ABCD order, left justified ("A" is the MSB, "D" is bit 4). The lower nibble is stuffed with 0. The CAS bits are stolen (bit robbing) from the LSB of the DS0 frames 6, 12, 18, and 24 of the Extended Superframe (ESF), composed of 24 DS1 frames plus formatting.

TABLE 1

Sequence Count Field = 0

| Sequence Count 0 Total Bytes | Data Type | # bytes |
|---|---|---|
| 5 | ATM Cell Header | 5 |
| 6 | AAL1 SAR PDU Header | 1 |
| 7 | SDT Pointer | 1 |
| 31 | 24 DS0 Samples | 24 |
| 32 | CAS bits | 1 |
| 53 | 21 DS0 Samples | 21 |

TABLE 2

Sequence Count Field = 1

| Sequence Count 1 Total Bytes | Data Type | # bytes |
|---|---|---|
| 5 | ATM Cell Header | 5 |
| 6 | AAL1 SAR PDU Header | 1 |
| 9 | 3 DS0 samples | 3 |
| 10 | CAS bits | 1 |
| 34 | 24 DS0 samples | 24 |
| 35 | CAS bits | 1 |
| 53 | 18 DS0 samples | 18 |

TABLE 3

Sequence Count Field = 2

| Sequence Count 2 Total Bytes | Data Type | # bytes |
|---|---|---|
| 5 | ATM Cell Header | 5 |
| 6 | AAL1 SAR PDU Header | 1 |
| 12 | 6 DS0 samples | 6 |
| 13 | CAS bits | 1 |
| 37 | 24 DS0 samples | 24 |
| 38 | CAS bits | 1 |
| 53 | 15 DS0 samples | 15 |

TABLE 4

Sequence Count Field = 3

| Sequence Count 3 Total Bytes | Data Type | # bytes |
|---|---|---|
| 5 | ATM Cell Header | 5 |
| 6 | AAL1 SAR PDU Header | 1 |
| 15 | 9 DS0 samples | 9 |
| 16 | CAS bits | 1 |
| 40 | 24 DS0 samples | 24 |

TABLE 4-continued

Sequence Count Field = 3

| Sequence Count 3 Total Bytes | Data Type | # bytes |
|---|---|---|
| 41 | CAS bits | 1 |
| 53 | 12 DS0 samples | 12 |

TABLE 5

Sequence Count Field = 4

| Sequence Count 4 Total Bytes | Data Type | # bytes |
|---|---|---|
| 5 | ATM Cell Header | 5 |
| 6 | AAL1 SAR PDU Header | 1 |
| 18 | 12 DS0 samples | 12 |
| 19 | CAS bits | 1 |
| 43 | 24 DS0 samples | 24 |
| 44 | CAS bits | 1 |
| 53 | 9 DS0 samples | 9 |

TABLE 6

Sequence Count Field = 5

| Sequence Count 5 Total Bytes | Data Type | # bytes |
|---|---|---|
| 5 | ATM Cell Header | 5 |
| 6 | AAL1 SAR PDU Header | 1 |
| 21 | 15 DS0 samples | 15 |
| 22 | CAS bits | 1 |
| 46 | 24 DS0 samples | 24 |
| 47 | CAS bits | 1 |
| 53 | 6 DS0 samples | 6 |

TABLE 7

Sequence Count Field = 6

| Sequence Count 6 Total Bytes | Data Type | # bytes |
|---|---|---|
| 5 | ATM Cell Header | 5 |
| 6 | AAL1 SAR PDU Header | 1 |
| 24 | 18 DS0 samples | 18 |
| 25 | CAS bits | 1 |
| 49 | 24 DS0 samples | 24 |
| 50 | CAS bits | 1 |
| 53 | 3 DS0 samples | 3 |

TABLE 8

Sequence Count Field = 7

| Sequence Count 7 Total Bytes | Data Type | # bytes |
|---|---|---|
| 5 | ATM Cell Header | 5 |
| 6 | AAL1 SAR PDU Header | 1 |
| 27 | 21 DS0 samples | 21 |
| 28 | CAS bits | 1 |
| 52 | 24 DS0 samples | 24 |
| 53 | CAS bits | 1 |

Clock Generation 425

The FS6370 EEPROM Programmable Clock Generation IC 425 provides clocking for the FPGA and several peripherals. A 16 MHz input 426 to the FS6370 is used because this frequency facilitates generation of many other needed system clock frequencies. The 20 MHz clock signal is used for Ethernet processing and the 512 kHz clock signal is used to support the GCI interface. In another implementation, a master system clock may replace this 512 kHz clock signal.

SRAM 413

A SRAM 413 will be used by the FPGA 45 as scratchpad RAM in case there is not enough memory inside the FPGA to handle all of the FIFO's and packetizing RAM needed for the ATM and Ethernet processing functions.

BIT Blaster Port 430

FPGA 45 is SRAM-based and requires configuration after power-up. The BIT Blaster port is an on-board header that is used to configure the FPGA 45 during the prototype development only. The EPC1 serial EPROM must not be installed when using the BIT Blaster port. The on-board EPC1 serial EPROM 435 will configure the FPGA during normal operations.

Ethernet Interface 420

The 28-pin ML2653, 10BASE-T Physical Interface Chip 420, is a complete physical interface for twisted pair and AUI Ethernet applications. It combines a 10BASE-T MAU, Manchester Encoder/Decoder, and Twisted Pair Interface filters in one monolithic IC. The ML2653 420 can automatically select between an AUI and twisted pair interface based on Link Pulses. The ML2653 conforms to IEEE 802.31—1990 (10Base-T), and together with the header formation in the FPGA, it will accept and provide Ethernet packets pursuant to the G.802 standard for packet structure.

Data Path Logical Flow

Figure 15:
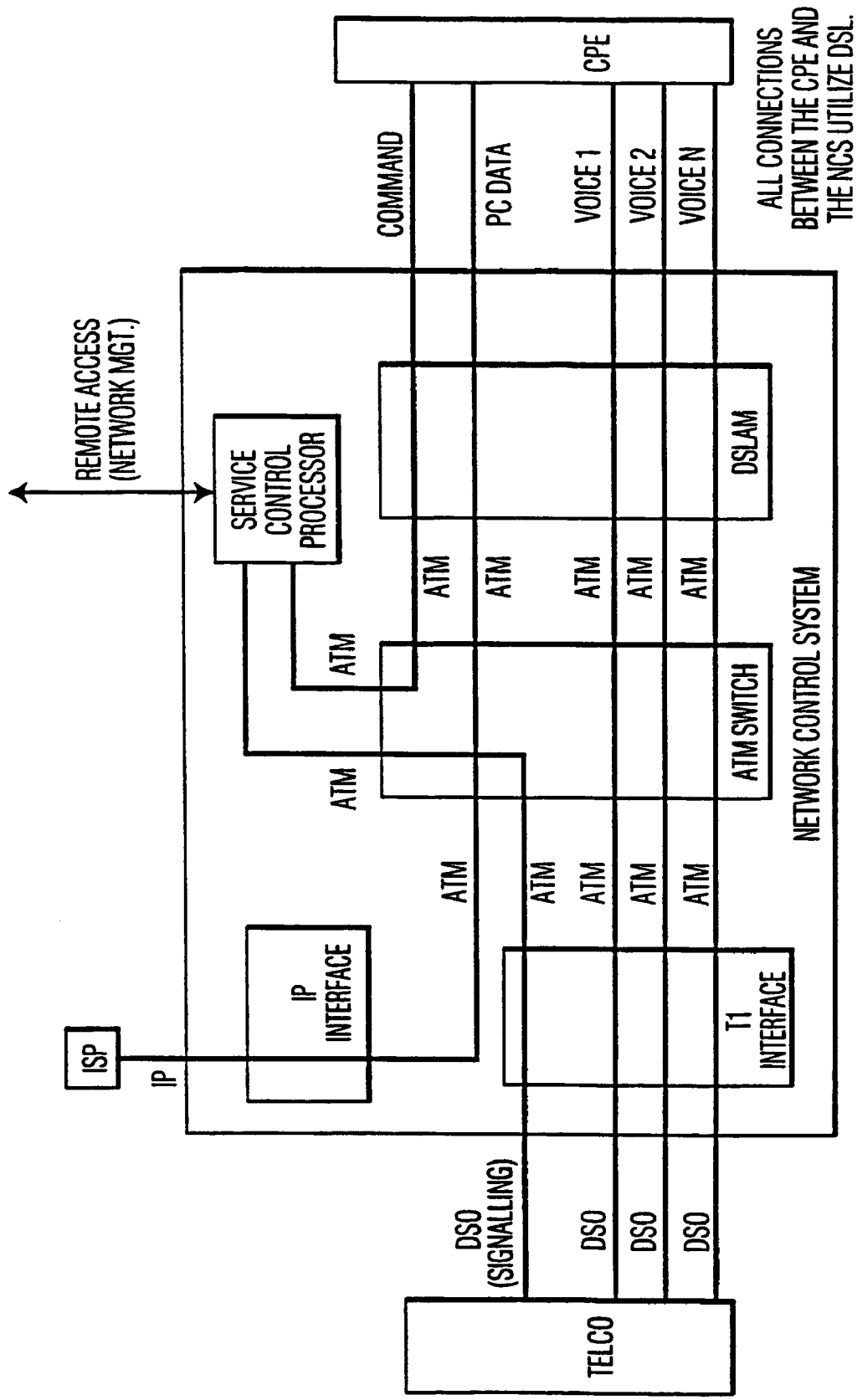
FIG. 15 shows the logical flow of the data paths between CPE and NCS.

FIG. 15 shows the logical flow of the data paths from the CPE through the NCS and back again (bi-directional). Also shown are the data formats used between the different functional blocks.

The voice data paths may be connected to a Telco's network via T1 links as described before. A T1 consists of 24 voice channels called DS0's as shown in. Hence each voice data path uses one of 24 DS0 channels of the T1 connection.

Figure 17:
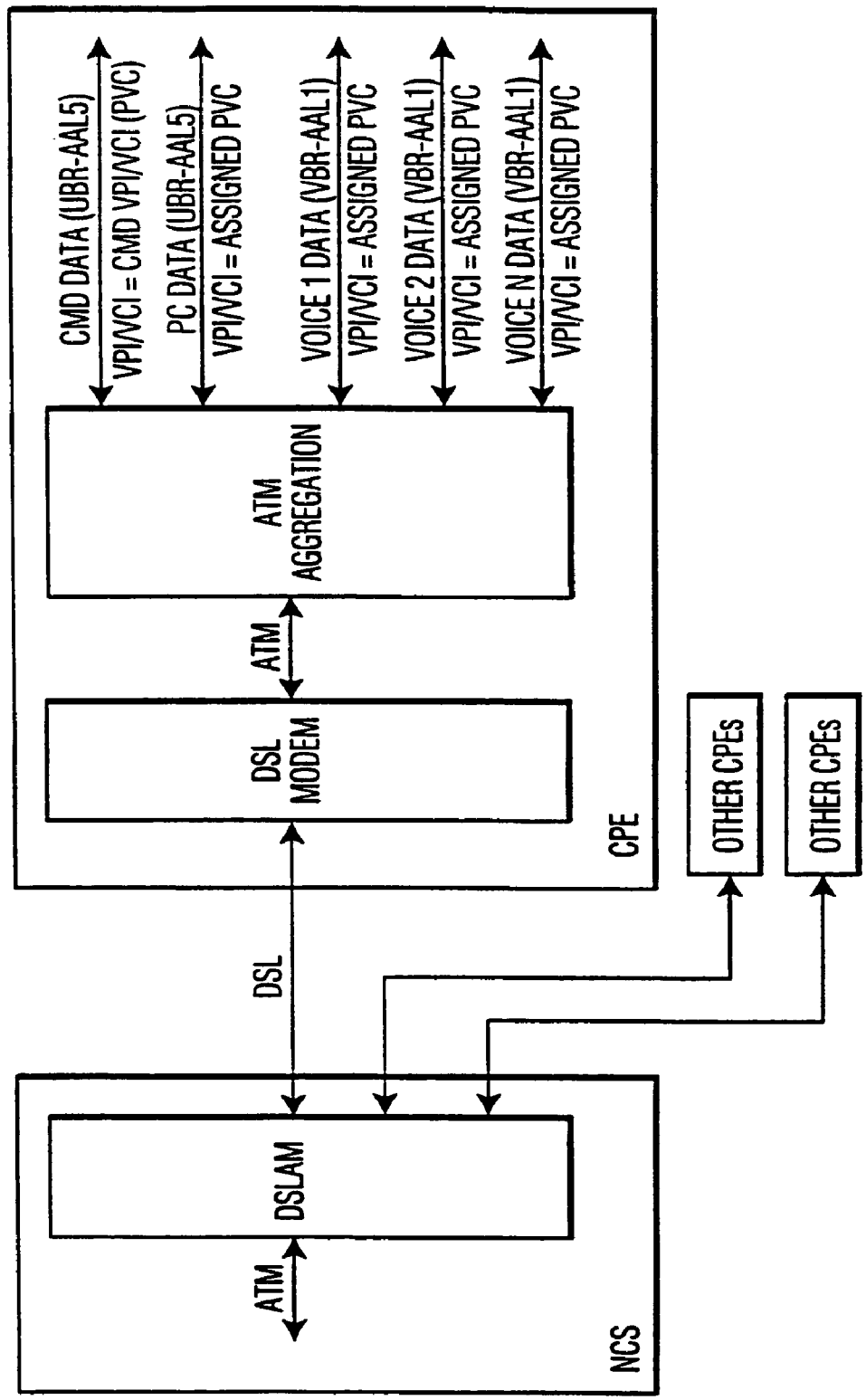
FIG. 17 illustrates how voice data paths are set as variable bit rate (VBR) while the command and PC paths are set as unspecified bit rate (UBR).

The voice data paths are variable bit rate (VBR) while the command and PC paths are unspecified bit rate (UBR) as shown, for example, in FIG. 17.

Figure 16:
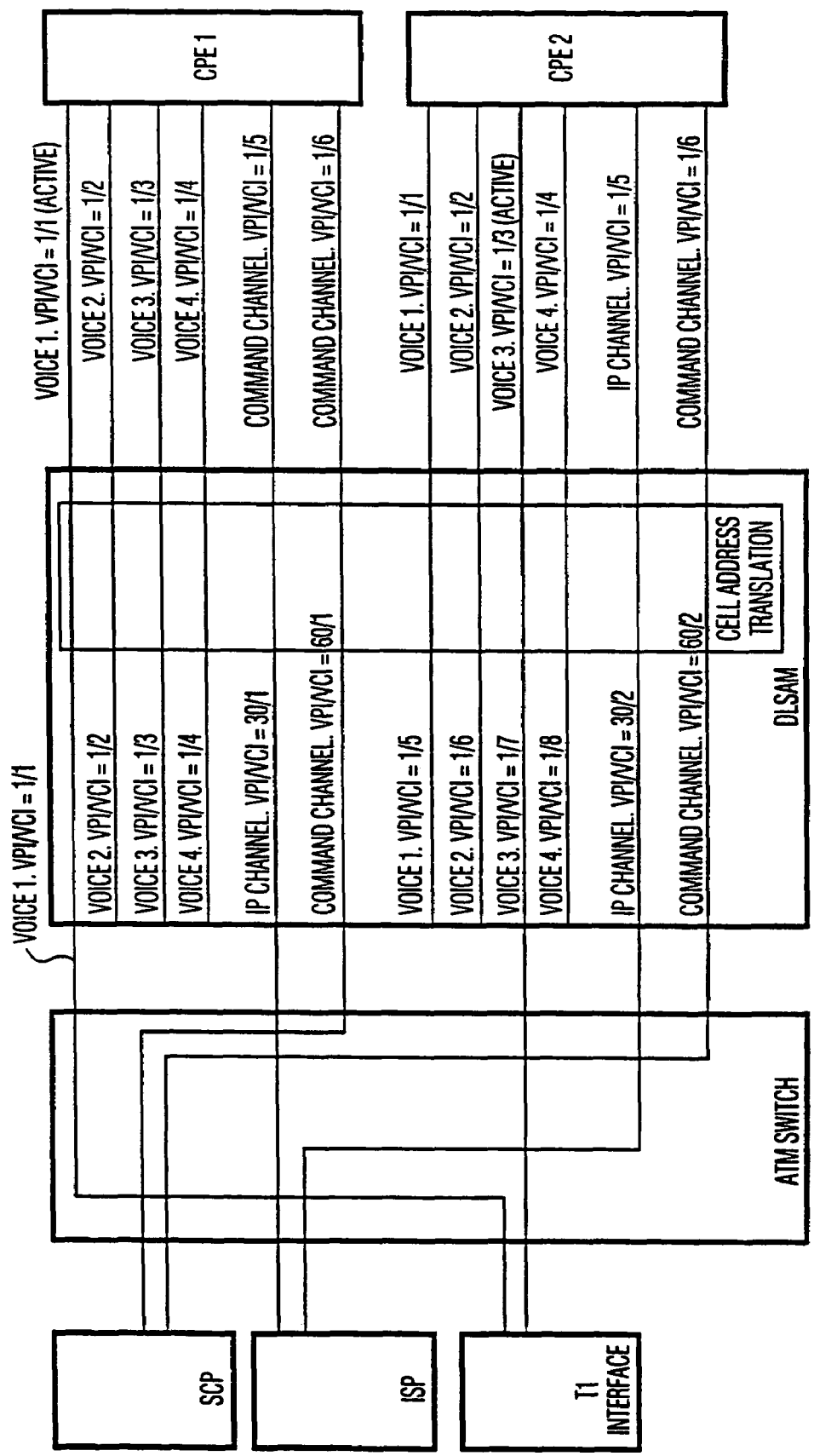
FIG. 16 is another block diagram of the data paths between the CPEs and the NCS.

FIG. 16 is a block diagram of the data paths between the CPEs and the NCS.

Note that the Command and PC data paths are UBR while all of the voice paths are specified as VBR and are assigned a unique VPI/VCI for each path. Refer to the Voice Traffic Management section for a description of how the NCS manages the data path allocation for the voice channels. The voice data is formatted using as-vtoa-0078 on AAL1.

The Command channel is a non-blocking channel to the NCS (and ultimately to the SCP) so that a CPE is always in contact with the NCS. Bandwidth will have to be allocated so that the maximum number of CPEs have sufficient bandwidth to allow communication with the NCS.

The PC data path is also a non-blocking channel but could drop to a minimum bandwidth in the event of network congestion. This non-blocking channel requires that sufficient bandwidth will have to be allocated accordingly.

As ATM cells move through the NCS, the cells can have their ATM addresses (VPIs/VCIs) translated. In addition, the ATM cells that carry voice data can be blocked at the DSLAM. FIG. 16 is an example of the data paths for ATM cells from two CPEs.

In this example, there are 2 active voice channels; Voice 1 of CPE 1 and Voice 3 of CPE 2. The other voice channels are "blocked" at the DSLAM since they are not carrying any data. Refer to the Voice Traffic Management paragraph for a description of how this occurs.

Operational Call Flow Sequences

The following sections describe how each major components of the present invention operate in response to different call flow scenarios.

Figure 7:
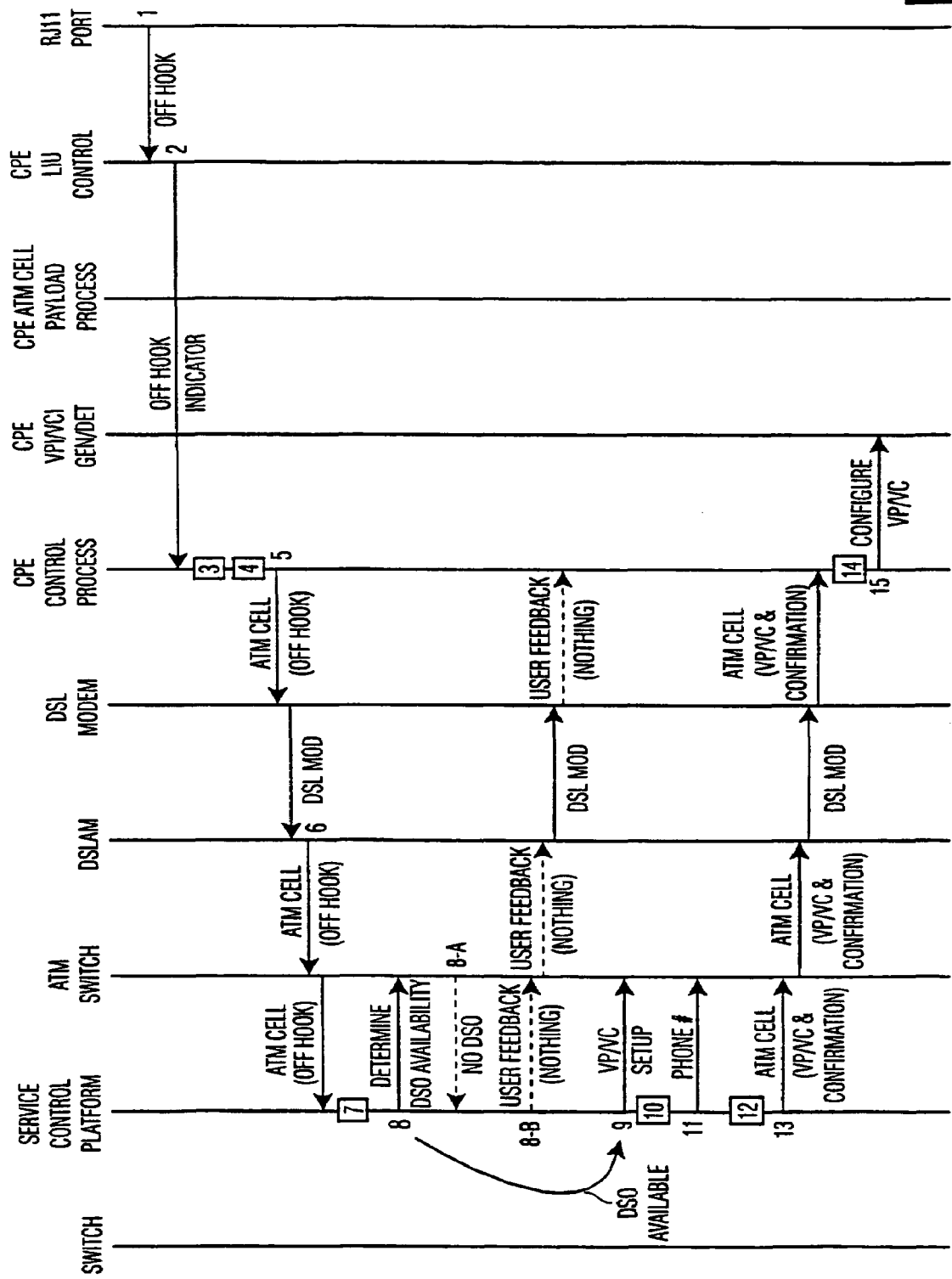
FIG. 7 shows the operational scenario diagram for placing or initiating a call.

FIG. 7 shows the operational scenario diagram for placing or initiating a call. The sequence enumeration is further described in the paragraphs that follow.

1. One of the 4 phone lines on the CPE goes off hook.

2. The corresponding LIU signals an off hook indication to the CPE processing unit.

3. The CPE processing unit recognizes the change of state of the off hook.

4. The CPE processing unit formats an ATM cell containing a unique CPE identifier, the off hook indication, and the telephone port ID on the CPE.

5. The CPE issues the ATM cell to the network through the DSL interface.

6. The DSLAM passes the ATM cell to the ATM switch, which routes it to the SCP.

7. The Service Control Processor (SCP) recognizes the request from the CPE.

8. The SCP determines the availability of a DS0 slot connecting to the public network.

8(a). The SCP determines that no DS0 is available.

8(b). The SCP generates user feedback. In this case, that feedback is nothing, to emulate the telephone network when a connection to a switch is not available.

9. The SCP creates a VP/VC path connecting the available DS0 slot to the DSLAM port of the CPE.

10. The SCP checks it's database and retrieves the phone number corresponding to the CPE port.

11. The SCP informs the T1 line card of the calling (source) phone number.

12. The SCP creates an ATM cell, which contains the VP/VC of the established connection and a confirmation message of the connection.

13. The cell created by the SCP is transmitted through the ATM switch to the port of the ATM switch connected to the DSLAM and on to the CPE. This cell VP/VC terminates at the CPE processing unit.

14. The CPE processing unit receives the ATM cell.

15. The CPE processing unit configures the VP/VC generation/detection to the directed VP/VC.

16. The ATM VP/VC channel begins carrying the DS0 payload between the LIU of the CPE all the way to the T1 line emulation cards in the switch.

17. Call progress, tone generation, and tone detection proceeds between the telephone unit and the public telephone network.

Figure 8:
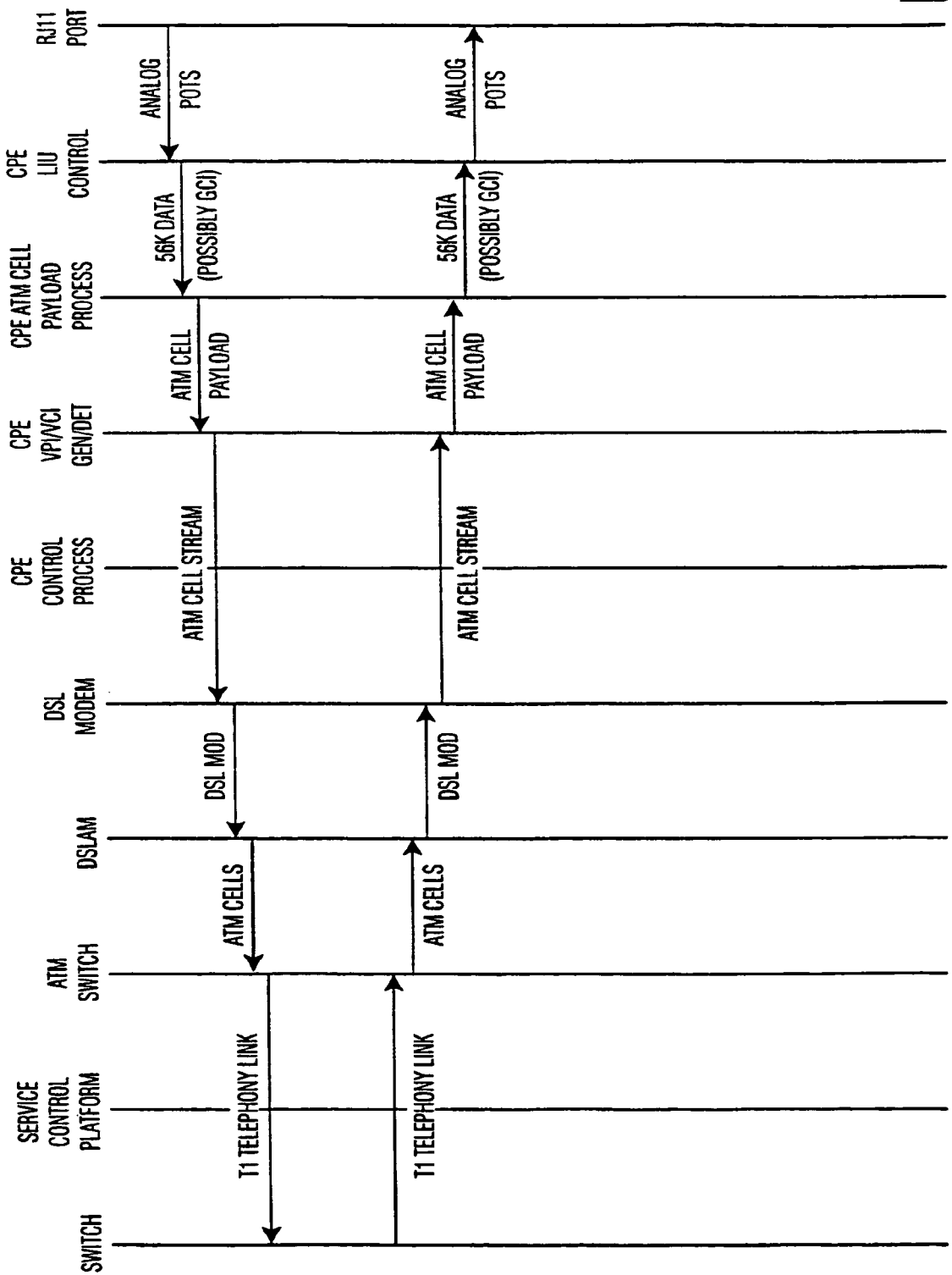
FIG. 8 shows the scenario diagram for the call in process operational sequence.

FIG. 8 shows the scenario diagram for the call in process operational sequence.

Figure 9:
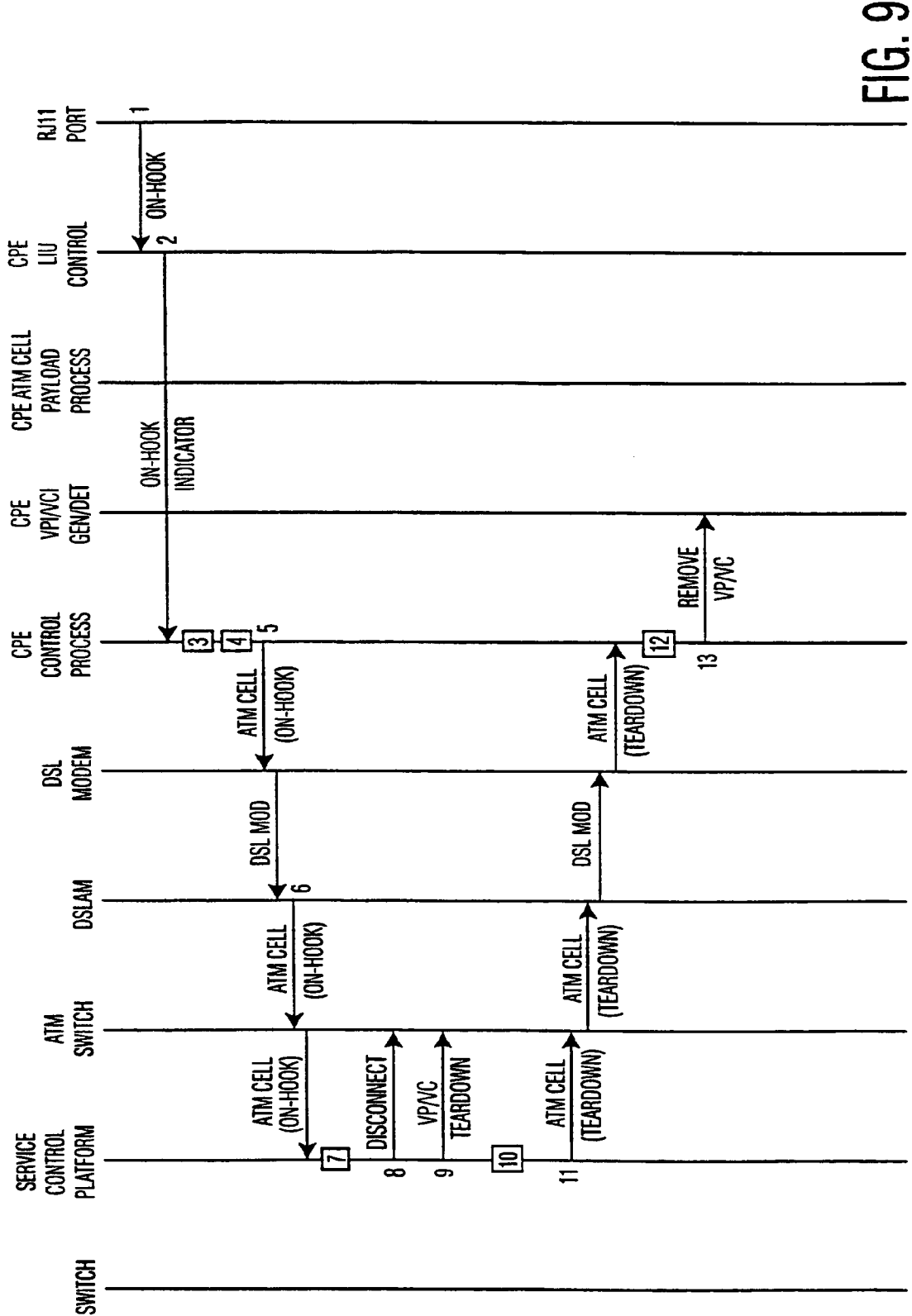
FIG. 9 shows the scenario diagram for the CPE call disconnect operational initiated by an CPE.

FIG. 9 shows the scenario diagram for the CPE call disconnect operational initiated by an CPE. The sequence enumeration is further described in the paragraphs that follow.

1. One of the 4 phone lines on the CPE goes on hook during an established call in Progress.

2. The corresponding LIU signals an on hook indication to the CPE processing unit.

3. The CPE processing unit recognizes the change of state of the on hook.

4. The CPE processing unit formats an ATM cell containing a unique CPE identifier, the on hook indication, and the telephone port ID on the CPE.

5. The CPE issues the ATM cell to the network through the DSL interface.

6. The DSLAM passes the ATM cell to the ATM switch, which routes it to the SCP.

7. The SCP recognizes the request from the CPE.

8. The SCP informs the T1 line emulation of the call disconnect.

9. The SCP tears down VP/VC path connecting the available DS0 slot to the DSLAM port of the CPE.

10. The SCP creates an ATM cell that acknowledges the call tear down.

11. The cell created by the SCP is transmitted through the ATM switch to the port of the ATM switch connected to the DSLAM and on to the CPE. This cell VP/VC terminates at the CPE processing unit.

12. The CPE processing unit receives the ATM cell.

13. The CPE processing unit removes the VP/VC generation/detection to the disconnected port.

Figure 10:
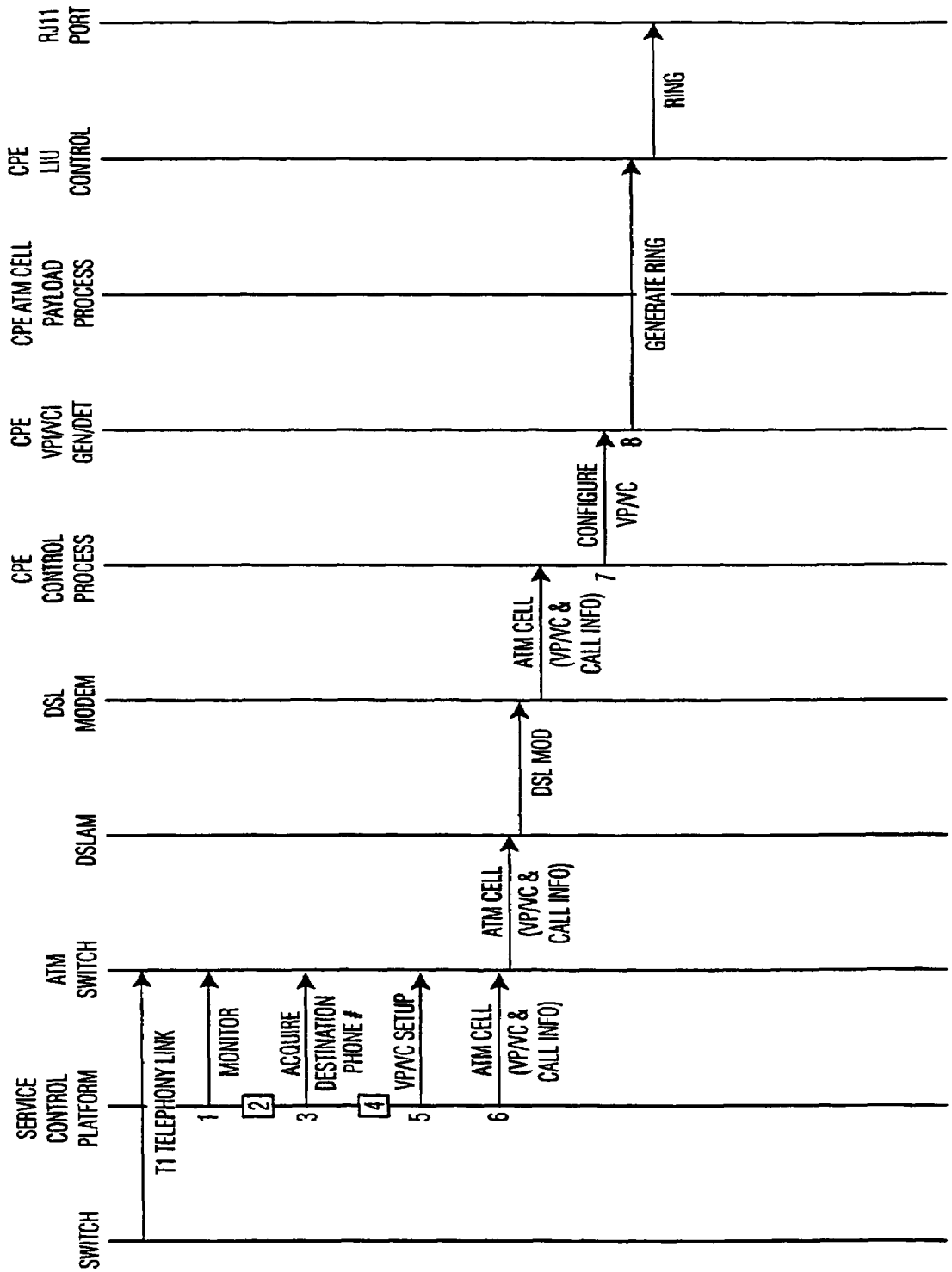
FIG. 10 shows the operational scenario diagram for incoming call.

FIG. 10 shows the operational scenario diagram for incoming call. The sequence enumeration is further described in the paragraphs that follow.

1. The SCP initially is monitoring the status of the T1 interface connected to the public telephone network.

2. A DS0 channel indicates an incoming call.

3. The SCP determines the destination telephone number from the T1 line emulation cards.

4. The SCP looks up the CPE port ID in a database relating phone numbers and Port Ids 5. The SCP creates a VP/VC connection to the DSLAM of the CPE containing the targeted phone port.

6. The SCP creates an ATM cell containing information on the incoming call, the targeted port, and the established VP/VC. This cell is transmitted to the CPE processing unit.
7. The CPE processing unit receives the cell and configures the targeted port with the VP/VC.
8. The CPE rings the phone at the appropriate RJ11 port.
9. At this point, the connection is set up from the T1 line emulator to the telephone port of the CPE.

Figure 11:
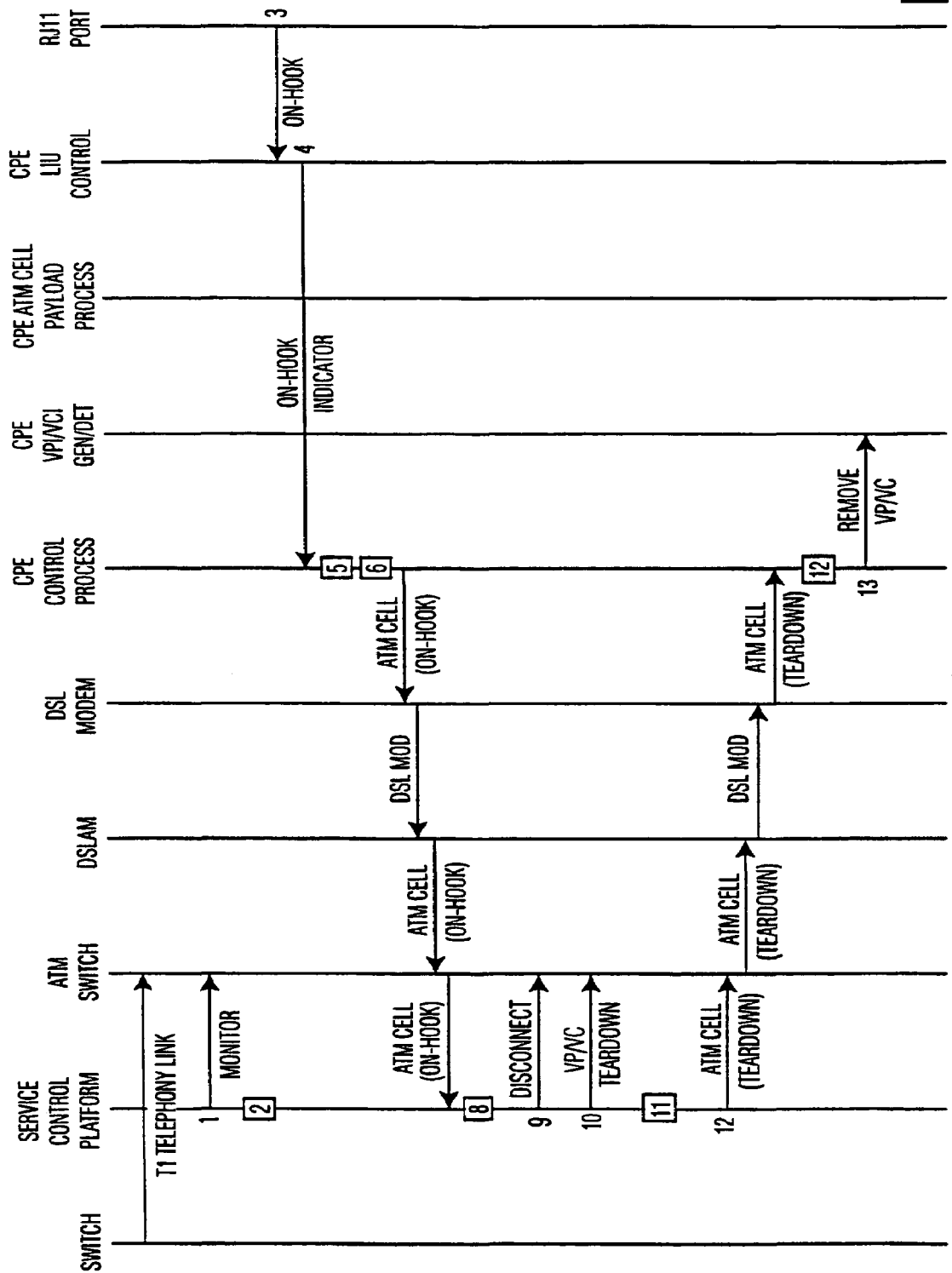
FIG. 11 shows the operational scenario diagram a call disconnect initiated by the telco switch or NCS.

FIG. 11 shows the operational scenario diagram a call disconnect initiated by the telco switch or NCS. The sequence enumeration is further described in the paragraphs that follow.
1. The SCP initially is monitoring the status of the T1 interface connected to the public telephone network.
2. A DS0 channel indicates a termination of an existing call.
3. The CPE device user goes on-hook.
4. The corresponding LIU signals an on-hook condition to the CPE processing unit.
5. The CPE processing unit recognizes the change of state of the on-hook.
6. The CPE processing unit formats an ATM cell containing a unique CPE identifier, the on hook indication, and the telephone port ID on the CPE.
7. The CPE issues the ATM cell to the network through the DSL interface. The DSLAM passes the ATM cell to the ATM switch, which routes it to the SCP.
8. The SCP recognizes the request from the CPE.
9. The SCP informs the T1 line emulation of the call disconnect.
10. The SCP tears down VP/VC path connecting the available DS0 slot to the DSLAM port of the CPE.
11. The SCP creates an ATM cell that acknowledges the call tear down.
12. The cell created by the SCP is transmitted through the ATM switch to the port of the ATM switch connected to the DSLAM and on to the CPE. This cell VP/VC terminates at the CPE processing unit.
13. The CPE processing unit receives the ATM cell and removes the VP/VC generation/detection to the disconnected port.

Voice Traffic Management

Voice traffic management refers to the control of data that carries voice information throughout the NCS and how it is managed when there is less system capacity than the theoretical maximum amount of data that could pass through the system. For example, if there are 100 telephone lines connected to the NCS but only 10 DS0 lines connected to the Telco, the DS0 lines must be allocated dynamically as connections are required for each telephone connection desired.

Statistics will be used to allocate an economical amount of physical data bandwidth at various points in the system. Since this number will be less than the theoretical maximum amount of data, there are different points in the system where data blocking could occur (i.e., a voice connection cannot be completed). The SCP will be responsible to manage the allocation of data channels as requested. And, in the event that a request cannot be fulfilled, the SCP is responsible to gracefully exit from that condition and inform the requesting entity of the non-compliance.

Figure 18:
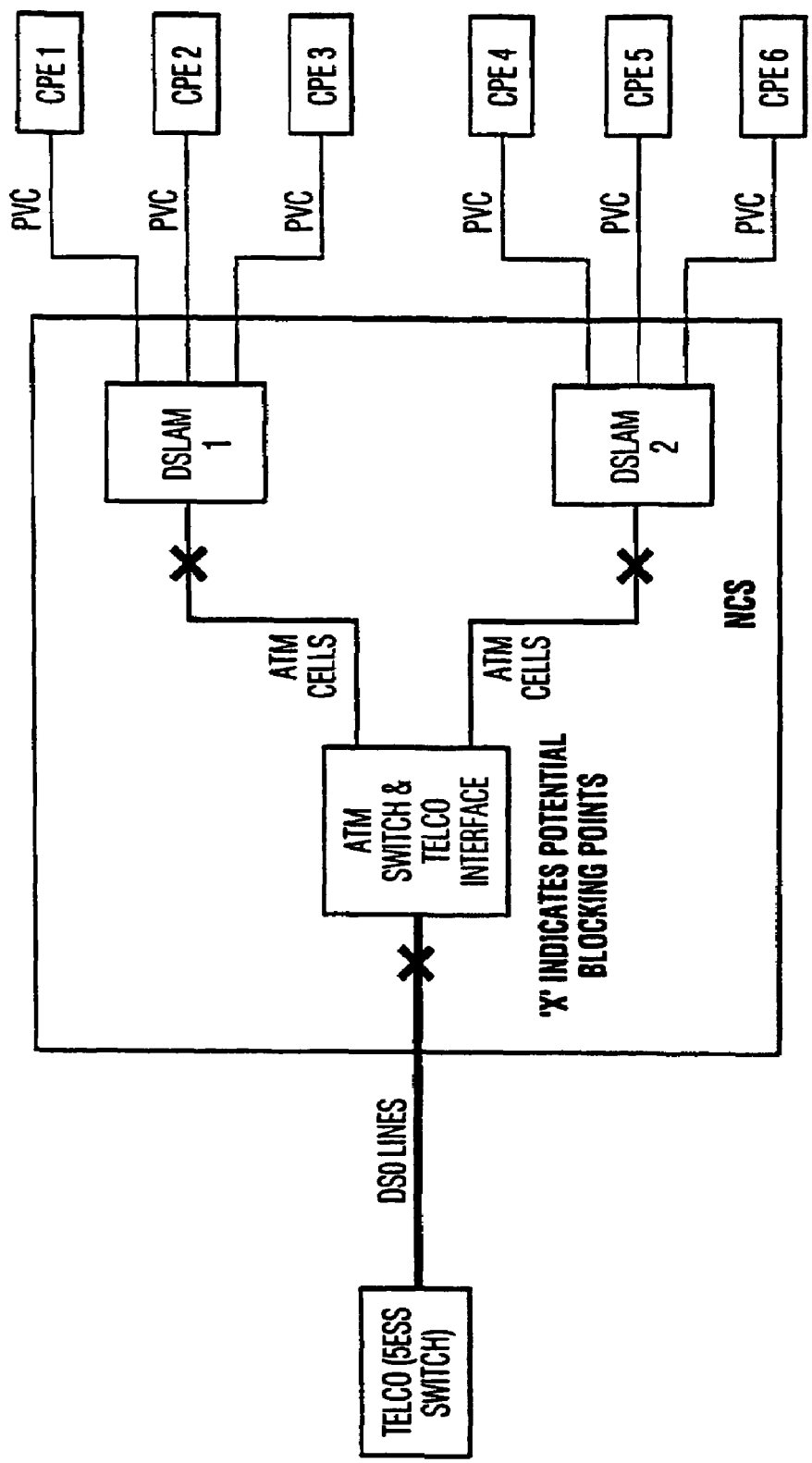
FIG. 18 is an example of the data paths for voice traffic through the NCS.

FIG. 18 is an example of the data paths for voice traffic through the NCS. Note that each CPE shows a voice channel going to the NCS via a PVC.

As shown in the figure, there is a potential of a call being blocked at the DSLAM or at the Telco switch. The potential block at the DSLAM is determined by the size of the DSLAM-to-ATM switch data path. The potential block at the Telco switch is determined by the number of DS0 lines.

Each voice channel PVC is established when the CPE is connected to the system. The PVC is specified as a Variable Bit Rate (VBR). This allows the DSLAM and ATM switch to be "over subscribed". That is, the ATM switch will allow all of the connections to be established since they are set up as VBR. The CPE will not transmit data on any voice channel until commanded to do so by the SCP.

In the example shown in FIG. 18, each DSLAM has only enough bandwidth to support a single voice channel to the ATM switch. However, it is possible that 3 channels could attempt to establish a connection. Prior to a connection, none of the CPEs are transmitting data on the voice channel, therefore the DSLAM is not passing data to the ATM switch. This allows the DSLAM-to-ATM switch to be completely unused in this example. Once a connection is established between a CPE (e.g., CPE 2) and the Telco, the SCP will command CPE 2 to start transmitting voice data on its data channel. Now the data path between DSLAM 1 and the ATM switch is full. No other voice connections can be made until CPE 2's connection is removed. Even though a PVC has been established between each CPE and the ATM switch, the SCP has control over the allocation of bandwidth by commanding each CPE to transmit or not transmit voice data.

Non-Voice Traffic Management

The data paths that do not carry voice data (i.e., the Command and PC data channels) are non-blocking and will have a minimum bandwidth available for each path. Traffic management is less of a concern for the SCPs in this case since the initial set-up of each data path will specify the path as UBR with a minimum data rate. The ATM devices will enforce this data rate as a function of the ATM protocol itself. As system throughput changes, the bandwidth for each channel will adjust accordingly based on the amount of data attempting to be passed through that channel.

This will require that each potential "choke point" in the data path must be implemented so that it will be able to handle the minimum amount of required bandwidth for the number of CPEs connected to the NCS.

Figure 19:
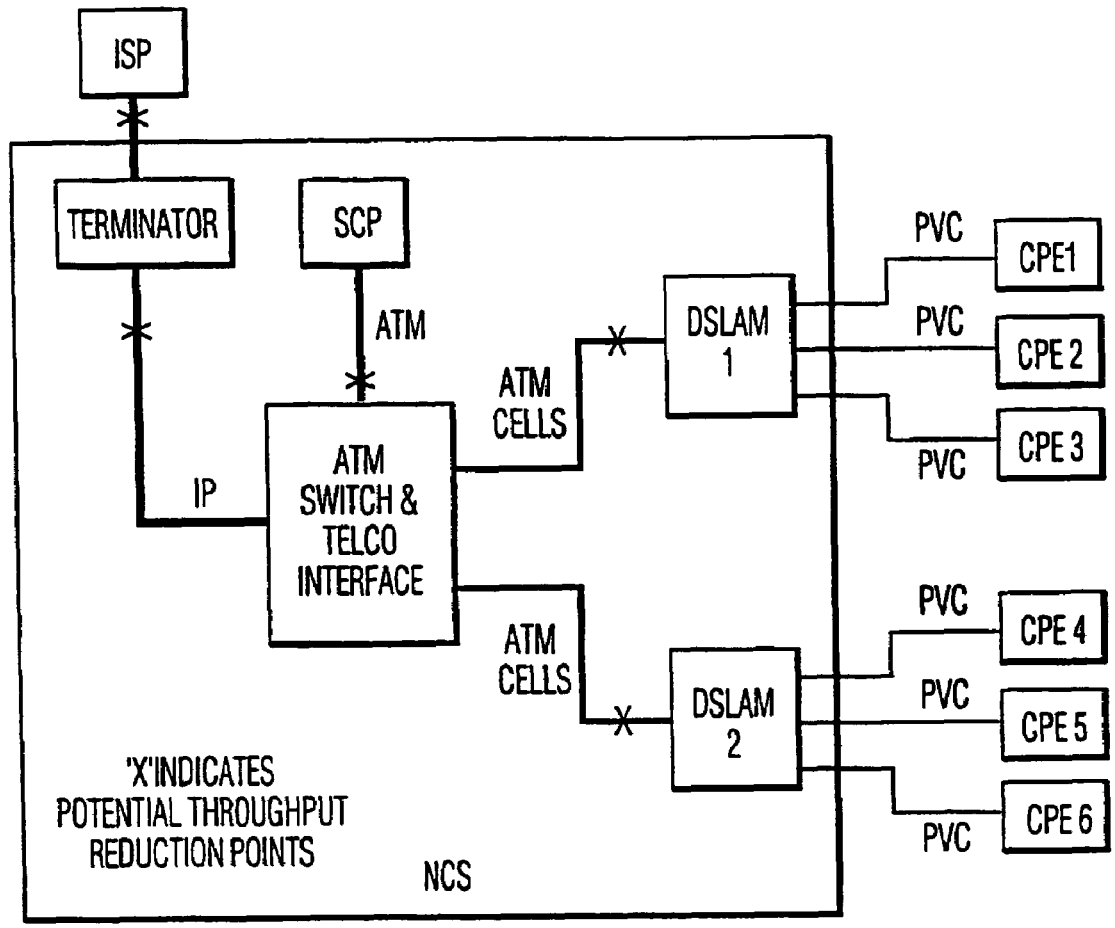
FIG. 19 is an example block diagram of where throughput can be reduced for a system consisting of 6 CPEs.

FIG. 19 is an example block diagram of where throughput can be reduced for a system consisting of 6 CPEs.

Each of the PVCs in the figure has a potential to be limited at each location as indicated. Therefore, each device in that data path must be able to accommodate the required amount of bandwidth (including transmission protocol overhead) for all non-blocking data channels connected to the system.

Enhanced POTS Services

As mentioned before, the present inventors recognize the need to provide a POTS service which is immune to, for example, power failure at the customer site and also possesses the ability to be statistically concentrated for efficient use of bandwidth.

The standard plain old telephone service (POTS) line that enters the home is powered by the central office line card using a battery or a generator. In the event of a power outage at the residence, this telephone service is still available, even if a subscriber is subscribing to a DSL service.

Figure 2:
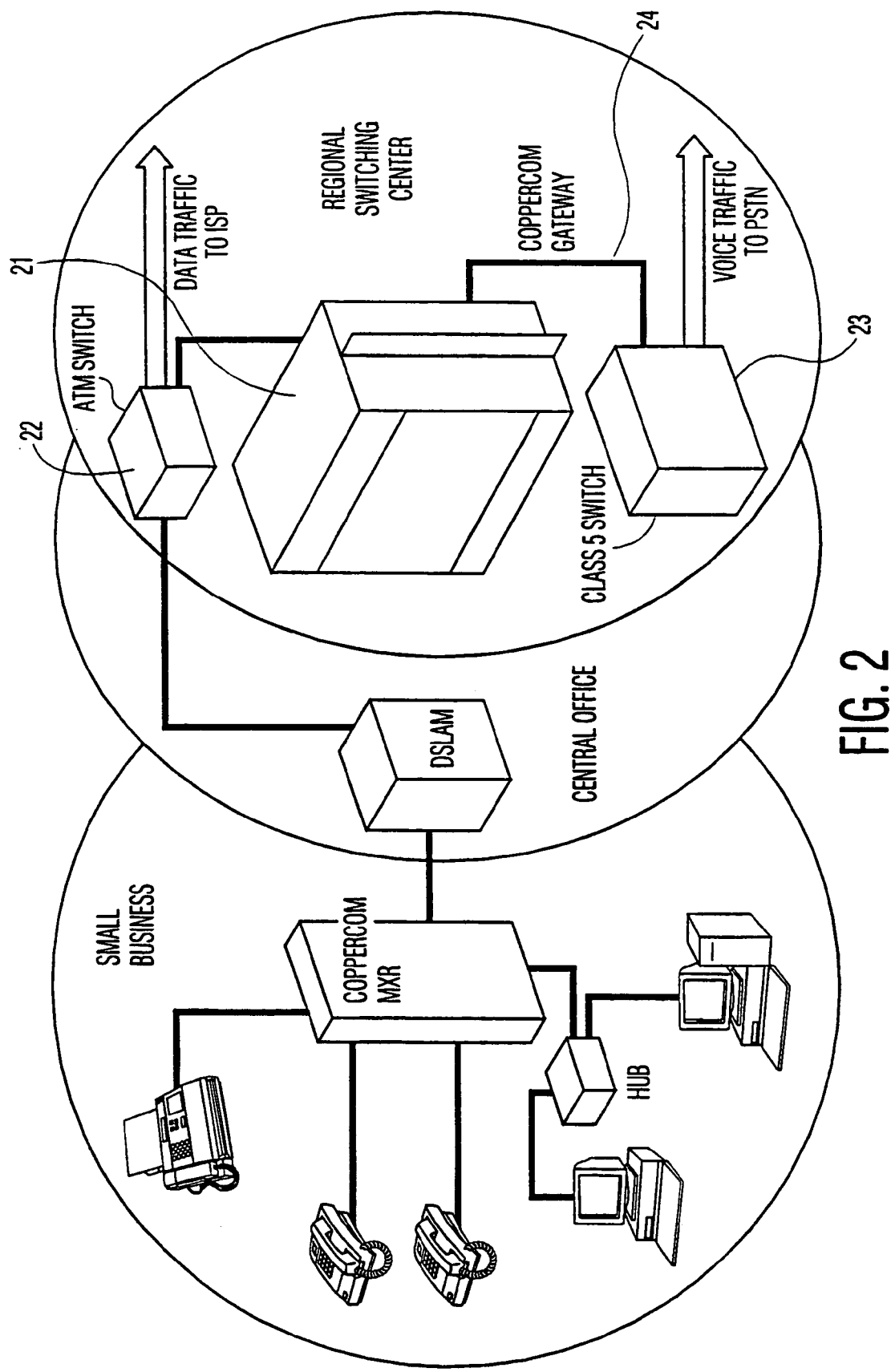
FIG. 2 shows a block diagram of another DSL architecture for providing both voice and data services.
Figure 20:
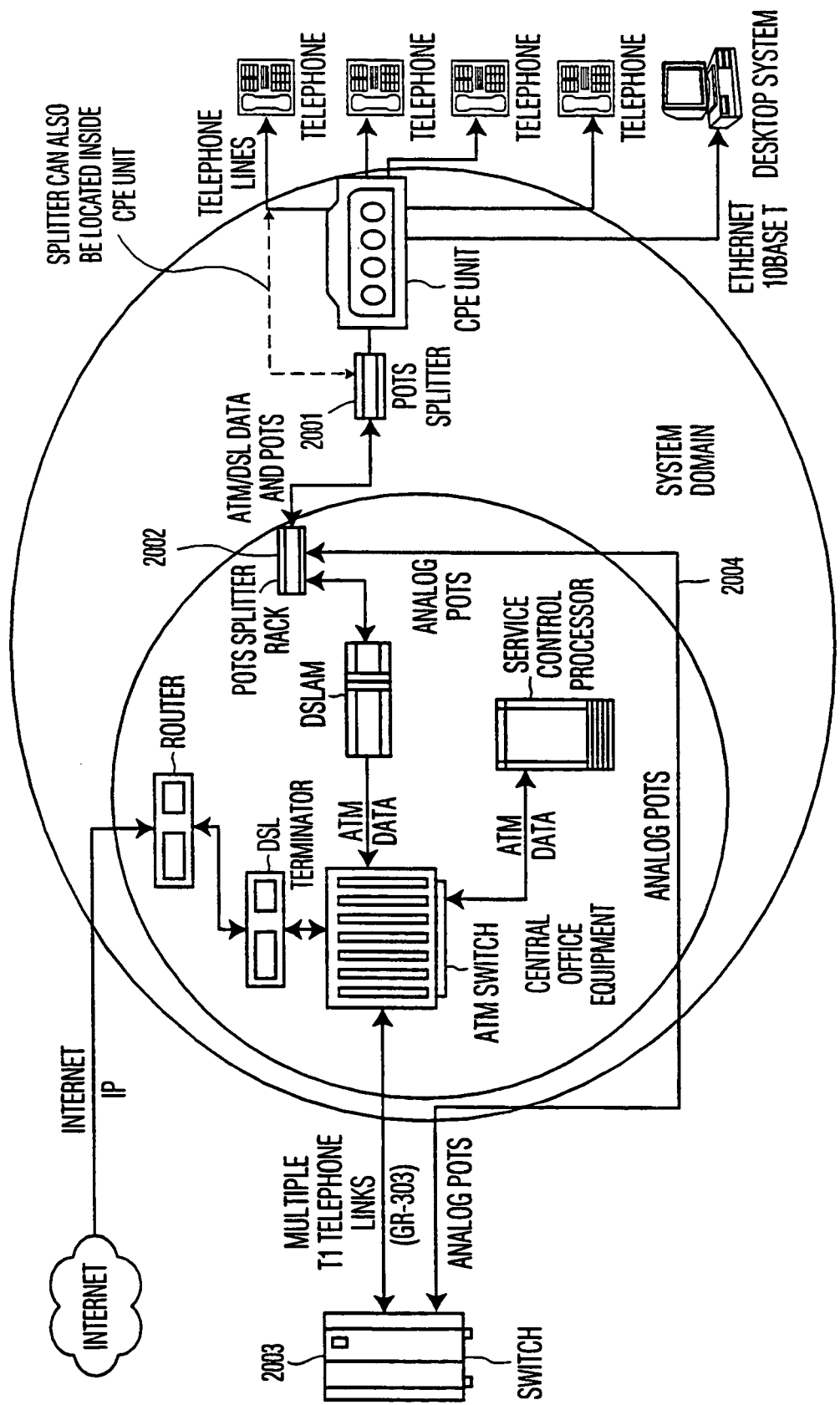
FIG. 20 is shows the traditional method of offering POTS service through DSL network.

FIG. 20 shows a traditional way to terminate an analog POTS service to the incumbent local exchange carrier (ILEC) switch, while subscribing to a DSL service. This architecture uses a POTS splitter 2001 and another POTS splitter 2002 at respective end of customer termination and the central office. In the event of a power failure at the customer site, POTS splitter 2001 will automatically bypass the CPE processing at the customer site and POTS splitter 2002 will route this POTS traffic to a telco switch 2003 via analog voice path 2004. One skilled in the art would readily recognize that this architecture of providing a POTS service is applicable to the systems shown in either FIG. 1, 2 or 3.

Although the architecture shown in FIG. 20 is certainly able to continue to provide POTS service in the event of, for example, a power failure, the present inventors recognize several drawbacks with this architecture. First, there is no way to statistically concentrate the POTS traffic before the POTS traffic reaches the LEC switch. Additionally, a competitive local exchange carrier (CLEC), such as a DSL provider, is unable to manage and provision the analog telephone service as part of its offering, since he or she is still relying on terminating this backup POTS traffic directly on the ILEC switch.

FIG. 21 shows an enhanced system and method of offering POTS through a DSL network to overcome the disadvantages of the architecture described above. As shown in FIG. 21, a POTS digitizer 2105 is added to the network. The POTS digitizer 2105 is coupled between a POTS splitter 2102 and an ATM switch 2106. The function of this equipment 2105 is to terminate the analog POTS line, digitize the voice, convert it to ATM, and then terminate it into the DSL network at the point of the ATM switch 2106. This piece of equipment have similar functionality as the customer CPE device as shown in FIGS. 3 and 4 and described before in terms digitizing analog voice, converting the digitized voice to an ATM stream and signaling and communicating with a Service Control Processor.

In FIG. 21, POTS splitters or switches 2101 and 2102 would route POTS traffic to the POTS digitizer automatically, in an event of power failure at the customer site. This could be done in many known ways, such as, for example, under the control of a CPU when it detects that the power supply line has dropped below a certain threshold. The CPU will then switch the connection from the telephone to the POTS terminator or digitizer 2105. In addition, although POTS splitter 2101 is shown as a separate unit from CPE 33-1, it could be incorporated as part of the CPE unit as shown for example, as element 414 of the CPE unit shown in FIG. 4.

Figure 22:
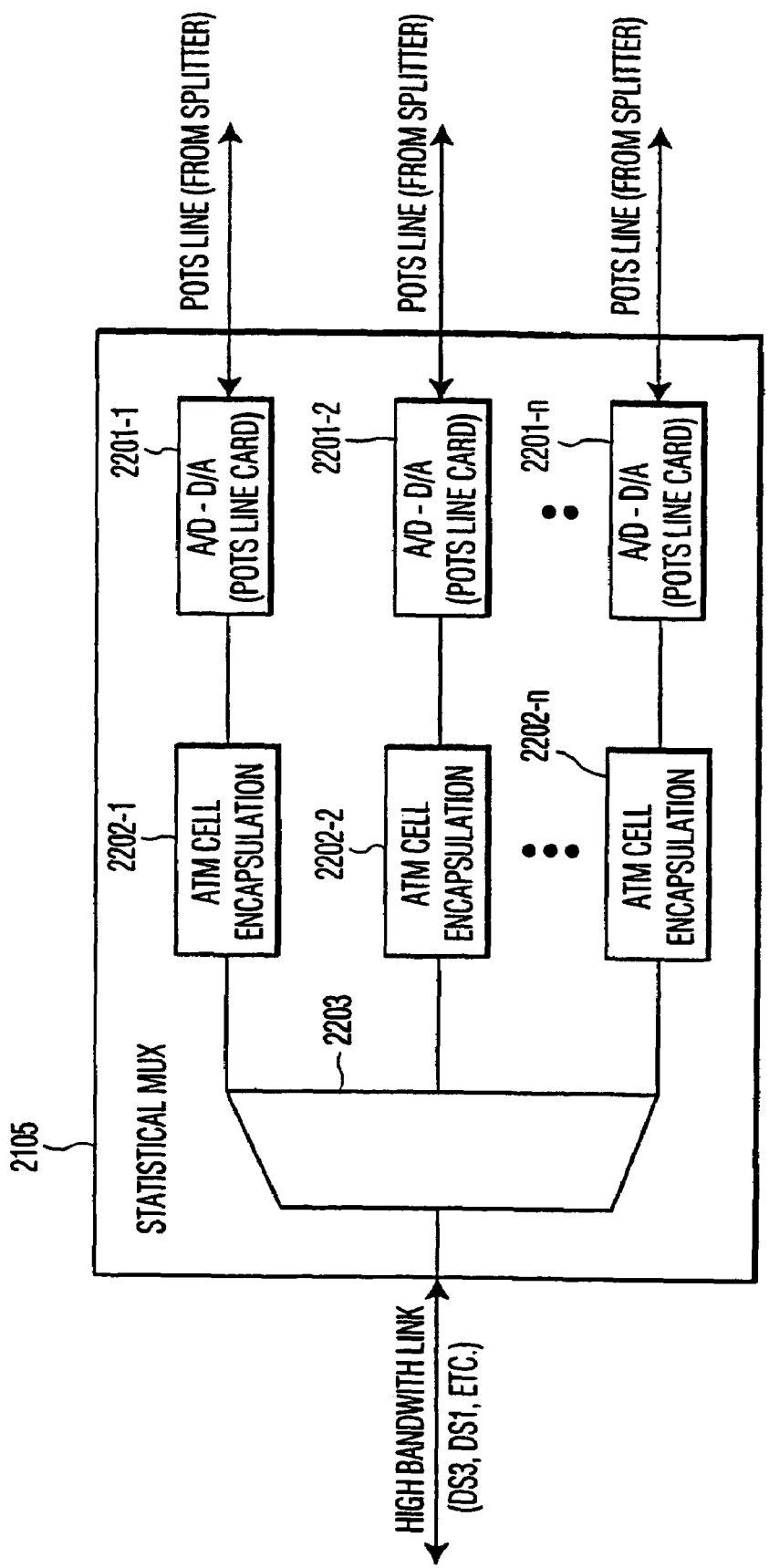
FIG. 22 is an exemplary block diagram of a POTS digitizer or terminator for providing POTS service in accordance with the principles of the present invention.

FIG. 22 shows a detailed block diagram of an exemplary POTS digitizer or terminator in accordance with the present invention. The device comprises POTS line cards 2201-1 to 2201-n, ATM cell processors 2202-1 to 2202-n and Statistical Multiplexes 2203. The functions of the POTS line cards are similar to that already described for interfaces 44-1 or 44-2 of the CPE device, as shown in FIG. 4. Likewise, the functions of the ATM cell processor 2202-1 to 2202-n are similar to that already described for ATM processing section 45 of the CPE device, as shown in FIG. 4. Statistical mux 2203 will then provide multiplexing function to multiplex available ones of the ATM data packets into a DS1 or higher stream as shown in FIG. 22, for coupling to a telco switch, for example.

The enhanced architecture described above for offering POTS through a DSL network, as shown in FIG. 20, therefore gives a DSL network operator the ability to manage all telephone service on a DSL network. The architecture is also able to provide POTS telephone service in the event of, for example, a power failure at the customer site, since the additional piece of equipment 2105 is being powered by either a battery or a generator at the central office.

The invention claimed is:

1. A system for providing POTS service in a digital subscriber loop (DSL) environment, the system comprising:

a signal POTS digitizer coupled between at least one POTS splitter and an ATM switch in the DSL environment, said signal digitizer capable of receiving traffic from said at least one POTS splitters, said POTS digitizer converting an analog signal into a digital signal in a first format in the event of a failure at a customer site, said first format being an ATM-compatible format;

said POTS digitizer including a statistical multiplexer, said statistical multiplexer multiplexing at least one digital signal in an ATM format; and said POTS digitizer coupling the digital signal in the first format over a digital signal line to the ATM switch connected to a telco switch.

2. The system of claim 1, wherein the analog signal is coupled to the signal digitizer via telephone wires.

3. The system Of claim 1, wherein said failure at the customer site is a power failure.

4. The system according to claim 1, further comprising a DSL access multiplexer (DSLAM), said POTS digitizer being integrated into said DSLAM.

5. A method for providing fault tolerant POTS service in a digital subscriber loop (DSL) environment, comprising the steps of:

receiving an analog telephone signal;

detecting a fault at a customer site;

bypassing a DSL modem upon detection of the fault:

routing the analog telephone signal to a POTS digitizer disposed between a POTS splitter and an ATM switch within the DSL environment;

routing at least one digital signal to a statistical multiplexer disposed within said POTS digitizer; and coupling the digital signal in a first format to the ATM switch connected to a telco switch through a digital signal line.

6. The method of claim 5, wherein the detected fault is a power failure at the customer site.

7. The method according to claim 5, wherein said signal digitizer is integrated into a DSL access Multiplexer (DSLAM) within the DSL environment.

8. A system for providing POTS telephone service in a digital subscriber loop (DSL) environment, the system having a customer premise equipment (CPE), a plurality of customer telephones connected to the CPE, and at least one POTS splitter connected to the CPE and adapted to connect the CPE to a service providers DSL network, the system comprising:

a POTS digitizer disposed within the service provider's DSL network and connected to an ATM switch within the DSL network, said POTS digitizer being capable of receiving traffic from the at least one POTS splitter, said POTS digitizer converting an analog signal into a digital signal in a first format in the event of a power failure at a customer site, said first format being an ATM-compatible format, said POTS digitizer including a statistical multiplexer, said multiplexer multiplexing at least one ATM data stream, and said POTS digitizer coupling the digital signal in the first format over a digital signal line to an ATM switch within the service provider's DSL network.

9. The system according to claim 8, wherein said POTS digitizer is connected between said at least one POTS splitter and said ATM switch.

10. The system according to claim 8, further comprising a DSL access multiplexer (DSLAM), said POTS digitizer being integrated into said DSLAM.

* * * * *